(12) United States Patent
Kang et al.

(10) Patent No.: US 10,904,567 B2
(45) Date of Patent: Jan. 26, 2021

(54) INTRA PREDICTION MODE-BASED IMAGE PROCESSING METHOD, AND APPARATUS THEREFOR

(71) Applicants: LG Electronics Inc., Seoul (KR); EWHA UNIVERSITY-INDUSTRY COLLABORATION FOUNDATION, Seoul (KR)

(72) Inventors: Je-Won Kang, Seoul (KR); Soo Kyung Ryu, Seoul (KR); Jaehyun Lim, Seoul (KR); Sunmi Yoo, Seoul (KR); Jaeho Lee, Seoul (KR); Min-Joo Kang, Seoul (KR)

(73) Assignees: LG Electronics Inc., Seoul (KR); EWHA UNIVERSITY-INDUSTRY COLLABORATION FOUNDATION, Seoul (KR)

(*) Notice: Subject to any disclaimer, the term of this patent is extended or adjusted under 35 U.S.C. 154(b) by 0 days.

(21) Appl. No.: 16/475,002

(22) PCT Filed: Dec. 28, 2016

(86) PCT No.: PCT/KR2016/015432
§ 371 (c)(1),
(2) Date: Jun. 28, 2019

(87) PCT Pub. No.: WO2018/124333
PCT Pub. Date: Jul. 5, 2018

(65) Prior Publication Data
US 2020/0007891 A1   Jan. 2, 2020

(51) Int. Cl.
*H04N 19/593* (2014.01)
*H04N 19/132* (2014.01)
(Continued)

(52) U.S. Cl.
CPC ......... *H04N 19/593* (2014.11); *H04N 19/132* (2014.11); *H04N 19/174* (2014.11); *H04N 19/18* (2014.11); *H04N 19/182* (2014.11)

(58) Field of Classification Search
USPC .................................................. 375/240.12
See application file for complete search history.

(56) References Cited

U.S. PATENT DOCUMENTS

| 2011/0176608 | A1 | 7/2011 | Kim et al. |
| 2012/0177113 | A1* | 7/2012 | Guo ..................... H04N 19/593 |
| | | | 375/240.12 |

(Continued)

FOREIGN PATENT DOCUMENTS

| EP | 2081386 | 7/2009 |
| KR | 20120025174 | 3/2012 |

(Continued)

OTHER PUBLICATIONS

Partial Supplementary European Search Report in European Application No. 16925718.5, dated Jul. 3, 2020, 10 pages.

(Continued)

*Primary Examiner* — Behrooz M Senfi
(74) *Attorney, Agent, or Firm* — Fish & Richardson P.C.

(57) ABSTRACT

Disclosed is a method for encoding/decoding a still image or moving image based on an intra-prediction mode and an apparatus supporting the same. Particularly, a method for processing an image based on an intra prediction mode may include determining an intra prediction mode set used for an intra prediction in a current prediction processing unit among multiple intra prediction mode sets having different resolutions with each other, wherein the resolution represents a degree of distribution of the intra prediction mode in the intra prediction mode set; deriving an intra prediction mode applied to the current prediction processing unit in the determined intra prediction mode set using index informa- (Continued)

tion received from an encoder; and generating a prediction sample of the current prediction processing unit based on the derived intra prediction mode, and each of the intra prediction mode sets includes one or more intra prediction modes.

9 Claims, 15 Drawing Sheets

(51) Int. Cl.
*H04N 19/174* (2014.01)
*H04N 19/18* (2014.01)
*H04N 19/182* (2014.01)

(56) References Cited

U.S. PATENT DOCUMENTS

| | | | | |
|---|---|---|---|---|
| 2013/0022119 A1* | 1/2013 | Chien | ......... | H04N 19/159 |
| | | | | 375/240.16 |
| 2013/0230104 A1* | 9/2013 | Song | ......... | H04N 19/176 |
| | | | | 375/240.12 |
| 2014/0219349 A1* | 8/2014 | Chien | ......... | H04N 19/105 |
| | | | | 375/240.13 |
| 2017/0310959 A1* | 10/2017 | Chen | ......... | H04N 19/11 |

FOREIGN PATENT DOCUMENTS

| KR | 20140110990 | 9/2014 |
|---|---|---|
| KR | 20150090010 | 8/2015 |
| KR | 20150115833 | 10/2015 |
| KR | 20150115886 | 10/2015 |

OTHER PUBLICATIONS

Extended European Search Report in European Appln. No. 16925718.5, dated Nov. 3, 2020, 11 pages.

Toshiba Corporation, "TE6 subset a: Bidirectional intra prediction," Joint Collaborative Team on Video Coding (JCT-VC) of ITU-T SG16 WP3 and ISO/[EC JTC1/SC29/WG11, 3rd meeting, Guangzhou, CN, Oct. 7-15, 2010, 10 pages.

* cited by examiner

Intra:

2Nx2N          NxN

Inter:

2Nx2N          NxN           2NxN          Nx2N nLx2N         nRx2N         2NxnU         2NxnD

FIG. 13

| | | | 1301 | | | | | 1303 |
|---|---|---|---|---|---|---|---|---|
| $R_{0,0}$ | $R_{1,0}$ | $R_{2,0}$ | ... | $R_{N,0}$ | $R_{N+1,0}$ | ... | ... | $R_{2N,0}$ |
| $R_{0,1}$ | $P_{1,1}$ | $P_{2,1}$ | ... | $P_{N,1}$ | −1 | ... | ... | −1 |
| $R_{0,2}$ | $P_{1,2}$ | | | | −1 | | | −1 |
| ⋮ | | | | | −1 | | | −1 |
| $R_{0,N}$ | $P_{1,N}$ | ... | | $P_{N,N}$ | −1 | | | −1 |
| $R_{0,N+1}$ | −1 | −1 | −1 | −1 | −1 | | | −1 |
| ⋮ | ⋮ | | | | | | | −1 |
| ⋮ | ⋮ | | | | | | | −1 |
| $R_{0,2N}$ | −1 | −1 | −1 | −1 | −1 | | | −1 |

1302

INTRA PREDICTION MODE-BASED IMAGE PROCESSING METHOD, AND APPARATUS THEREFOR

CROSS-REFERENCE TO RELATED APPLICATIONS

This application is the National Stage filing under 35 U.S.C. 371 of International Application No. PCT/KR2016/015432, filed on Dec. 28, 2016, and the contents of which are all hereby incorporated by reference herein in their entirety.

TECHNICAL FIELD

The present invention relates to a method for processing a still image or moving image and, more particularly, to a method for encoding/decoding a still image or moving image based on an intra-prediction mode and an apparatus supporting the same.

BACKGROUND ART

Compression encoding means a series of signal processing techniques for transmitting digitized information through a communication line or techniques for storing information in a form suitable for a storage medium. The medium including a picture, an image, audio, etc. may be a target for compression encoding, and particularly, a technique for performing compression encoding on a picture is referred to as video image compression.

Next-generation video contents are supposed to have the characteristics of high spatial resolution, a high frame rate and high dimensionality of scene representation. In order to process such contents, a drastic increase in the memory storage, memory access rate and processing power will result.

Accordingly, it is required to design a coding tool for processing next-generation video contents efficiently.

DISCLOSURE

Technical Problem

Recently, it has been discussed a method for performing a prediction within picture using more modes of prediction within picture in comparison with the existing prediction within picture method (or intra-prediction method). The number of intra-prediction modes is increased, and a prediction direction is subdivided, and accordingly, more accurate prediction becomes available, but a bit for representing the intra-prediction mode is increased as the number of intra-prediction modes is increased, and accordingly, there is a problem that encoding rate becomes degraded.

In order to solve the problem, an object of the present invention proposes a method for encoding/decoding an intra-prediction mode using an intra prediction mode set in which resolutions are different.

In addition, an object of the present invention proposes a method for performing an intra-prediction by determining an intra prediction mode set in which resolutions are different adaptively for each pixel in a single block.

The objects of the present invention are not limited to the technical objects described above, and other technical that are objects not mentioned herein may be understood to those skilled in the art from the description below.

Technical Solution

In an aspect of the present invention, a method for processing an image based on an intra prediction mode may include determining an intra prediction mode set used for an intra prediction in a current prediction processing unit among multiple intra prediction mode sets having different resolutions with each other, wherein the resolution represents a degree of distribution of the intra prediction mode in the intra prediction mode set; deriving an intra prediction mode applied to the current prediction processing unit in the determined intra prediction mode set using index information received from an encoder; and generating a prediction sample of the current prediction processing unit based on the derived intra prediction mode, and each of the intra prediction mode sets includes one or more intra prediction modes.

In another aspect of the present invention, an apparatus for processing an image based on an intra prediction mode may include a prediction mode set determination unit for determining an intra prediction mode set used for an intra prediction in a current prediction processing unit among multiple intra prediction mode sets having different resolutions with each other, wherein the resolution represents a degree of distribution of the intra prediction mode in the intra prediction mode set; a prediction mode derivation unit for deriving an intra prediction mode applied to the current prediction processing unit in the determined intra prediction mode set using index information received from an encoder; and a prediction sample generation unit for generating a prediction sample of the current prediction processing unit based on the derived intra prediction mode, and each of the intra prediction mode sets includes one or more intra prediction modes.

Preferably, the step of determining the intra prediction mode set may include determining the intra prediction mode set using any one of a neighboring sample to a current block, a residual signal of the current block and a transform coefficient to which the residual signal is transformed in a frequency domain.

Preferably, the step of determining the intra prediction mode set may include determining the intra prediction mode set by calculating a variance value of $(2N+1)$ samples located on coordinates from $[-1, -1]$ to $[-1, 2N-1]$ based on an upper left sample of the current block and $2N$ samples located on coordinates from $[0, -1]$ to $[2N-1, -1]$ among neighboring samples to a current block of $N \times N$ size, and comparing the variance value with a specific threshold value.

Preferably, the step of determining the intra prediction mode set may include determining the intra prediction mode set by comparing an absolute value of a differential of sample values between two adjacent samples with a specific threshold value among $(2N+1)$ samples located on coordinates from $[-1, -1]$ to $[-1, 2N-1]$ based on an upper left sample of the current block and $2N$ samples located on coordinates from $[0, -1]$ to $[2N-1, -1]$ among neighboring samples to a current block of $N \times N$ size.

Preferably, the step of determining the intra prediction mode set may include determining the intra prediction mode set by calculating a number of cases that an absolute value of a differential of sample values between two adjacent samples exceeds a first threshold value among $(2N+1)$ samples located on coordinates from $[-1, -1]$ to $[-1, 2N-1]$ based on an upper left sample of the current block and $2N$ samples located on coordinates from $[0, -1]$ to $[2N-1, -1]$ among neighboring samples to a current block of N×N size, and comparing the calculated number with a second threshold value.

Preferably, the step of determining the intra prediction mode set may include determining the intra prediction mode set by comparing a residual signal of a current block or a sum of absolute values of transform coefficients of the residual signal with a specific threshold value.

Preferably, the intra prediction mode set may be transmitted in any one unit of a sequence, a slice, a CTU, a CU and a PU.

Preferably, when Most Probable Mode (MPM) encoding is applied to a current block, a number of MPM candidates may be determined depending on a number of intra prediction modes configuring the intra prediction mode set used for an intra prediction of the current block.

Preferably, the step of determining the intra prediction mode set may include: determining a first intra prediction mode set and a second intra prediction mode set used for an intra prediction of a current block among the multiple intra prediction mode sets, the step of deriving the intra prediction mode may include: deriving a first intra prediction mode applied to the current block in the first intra prediction mode set using the index information, the step of generating the prediction sample may further include: determining two reference samples used for a prediction of a current pixel based on the first intra prediction mode, when a differential of a sample value between two reference samples exceeds a specific threshold value, generating the prediction sample of the current pixel based on an intra prediction mode adjacent to a prediction direction of the first intra prediction mode in the second intra prediction mode set.

Preferably, the step of generating the prediction sample of the current pixel may further include: by comparing a prediction value generated based on the first intra prediction mode with a differential of a prediction value generated based on an intra prediction mode adjacent to left or right side of the prediction direction of the first intra prediction mode in the first intra prediction mode set based on the current pixel, deriving a second intra prediction mode applied to the current pixel among the intra prediction mode adjacent to left or right side of the prediction direction of the first intra prediction mode in the second intra prediction mode set based on the current pixel, and the prediction sample of the current pixel may be generated based on the second intra prediction mode.

Advantageous Effects

In accordance with the embodiment of the present invention, an intra-prediction mode is signaled to a decoder using a plurality of intra-prediction mode sets of which resolutions are different, and a bit for transmitting an intra-prediction mode is saved and encoding performance may be improved.

In addition, in accordance with the embodiment of the present invention, it is determined whether a boundary of an object or a complex texture is existed in a unit of pixel, and a resolution of a prediction mode set is adaptively determined, and accordingly, accuracy of prediction may be improved.

The technical effects of the present invention are not limited to the technical effects described above, and other technical effects not mentioned herein may be understood to those skilled in the art from the description below.

DESCRIPTION OF DRAWINGS

The accompanying drawings, which are included herein as a part of the description for help understanding the present invention, provide embodiments of the present invention, and describe the technical features of the present invention with the description below.

FIG. 13 is a diagram for describing a method for determining an intra-prediction mode set according to an embodiment of the present invention.

MODE FOR INVENTION

Figure 1:
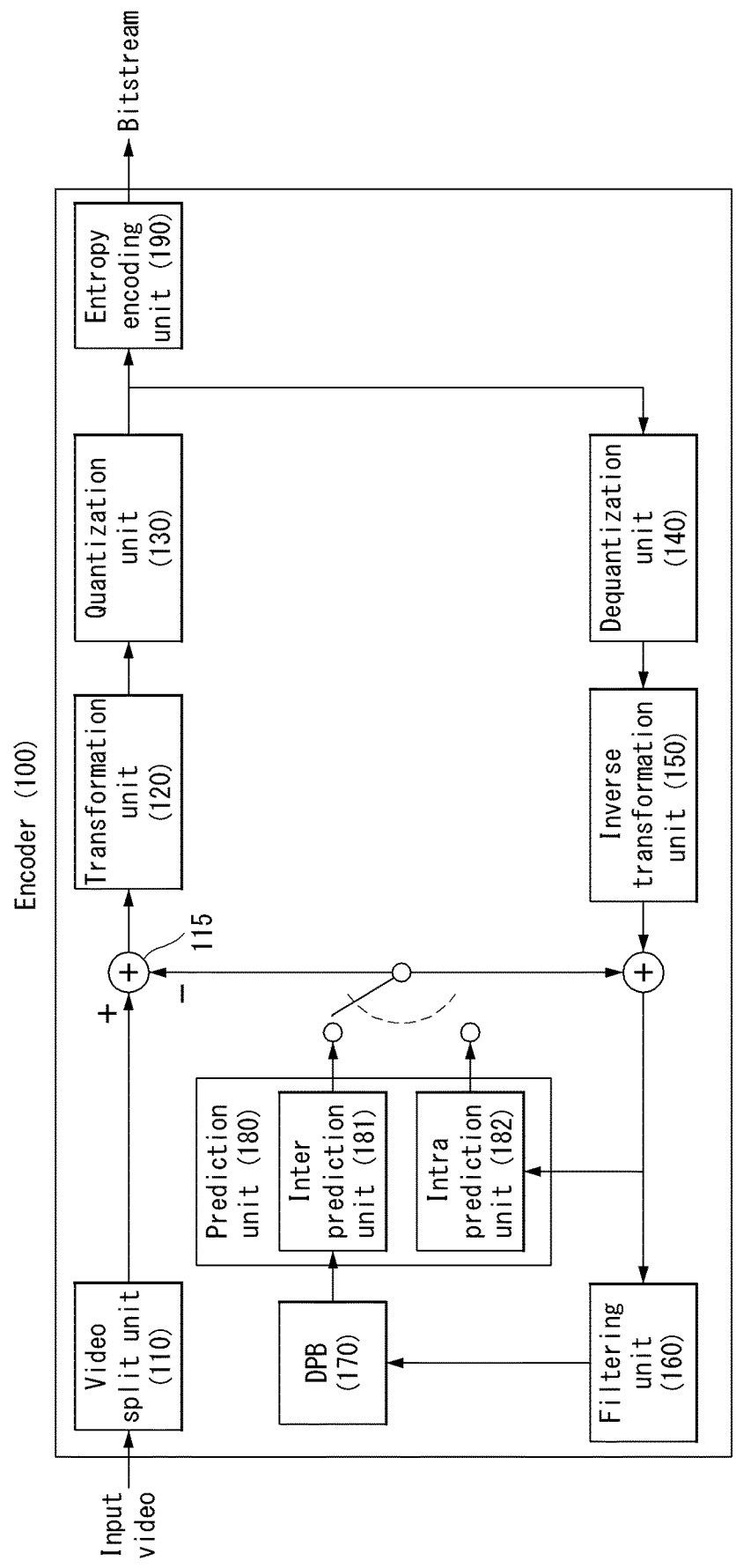
FIG. 1 illustrates a schematic block diagram of an encoder in which the encoding of a still image or video signal is performed, as an embodiment to which the present invention is applied.

Hereinafter, a preferred embodiment of the present invention will be described by reference to the accompanying drawings. The description that will be described below with the accompanying drawings is to describe exemplary embodiments of the present invention, and is not intended to describe the only embodiment in which the present invention may be implemented. The description below includes particular details in order to provide perfect understanding of the present invention. However, it is understood that the present invention may be embodied without the particular details to those skilled in the art.

In some cases, in order to prevent the technical concept of the present invention from being unclear, structures or devices which are publicly known may be omitted, or may be depicted as a block diagram centering on the core functions of the structures or the devices.

Further, although general terms widely used currently are selected as the terms in the present invention as much as possible, a term that is arbitrarily selected by the applicant is used in a specific case. Since the meaning of the term will be clearly described in the corresponding part of the description in such a case, it is understood that the present invention will not be simply interpreted by the terms only used in the description of the present invention, but the meaning of the terms should be figured out.

Specific terminologies used in the description below may be provided to help the understanding of the present invention. Furthermore, the specific terminology may be modified into other forms within the scope of the technical concept of the present invention. For example, a signal, data, a sample, a picture, a frame, a block, etc may be properly replaced and interpreted in each coding process.

Hereinafter, 'block' or 'unit' in this specification means a unit in which encoding/decoding processes such as prediction, conversion and/or quantization are performed, and may be composed of a multi-dimensional array of samples (or pixels).

The 'block' or 'unit' may mean a multi-dimensional array of samples for luma components, or a multi-dimensional array of samples for chroma components. In addition, it may be collectively referred to as including all the multi-dimensional array of samples for luma components, or the multi-dimensional array of samples for chroma components.

For example, the 'block' or 'unit' may be interpreted to include all of a coding block (CB) which means an array of samples to be subject to encoding/decoding, a coding tree block (CTB) composed of a plurality of coding blocks, a prediction block (PB) (or prediction unit (PU)) which means an array of samples to which the same prediction is applied, and a transform block (TB) (or a transform unit (TU)) which means an array of samples to which the same transformation is applied.

Unless otherwise described in this specification, the 'block' or 'unit' may be interpreted to include a syntax structure used in encoding/decoding an array of samples for luma components and/or chroma components. Here, a syntax structure means zero or more syntax elements existing in a bitstream in a specific order, and the syntax element means an element of data represented in the bitstream.

For example, the 'block' or 'unit' may be interpreted to include all of a coding unit (CU) including the coding block (CB) and a syntax structure used for encoding the corresponding coding block (CB), a coding tree unit (CU) composed of a plurality of coding units, a prediction unit (PU) including the prediction block PB and a syntax structure used for prediction of the corresponding prediction block PB, and a transform unit (TU) including the transform block (TB) and a syntax structure used for transforming the corresponding transform block (TB).

In addition, the 'block' or 'unit' in this specification is not necessarily limited to an array of samples (or pixels) in the form of a square or a rectangle, and may mean an array of polygonal samples (or pixels) having three or more vertices. In this case, it may be referred to as a polygon block or a polygon unit.

FIG. 1 is illustrates a schematic block diagram of an encoder in which the encoding of a still image or video signal is performed, as an embodiment to which the present invention is applied.

Referring to FIG. 1, the encoder 100 may include a video split unit 110, a subtractor 115, a transform unit 120, a quantization unit 130, a dequantization unit 140, an inverse transform unit 150, a filtering unit 160, a decoded picture buffer (DPB) 170, a prediction unit 180 and an entropy encoding unit 190. Furthermore, the prediction unit 180 may include an inter-prediction unit 181 and an intra-prediction unit 182.

The video split unit 110 splits an input video signal (or picture or frame), input to the encoder 100, into one or more processing units.

The subtractor 115 generates a residual signal (or residual block) by subtracting a prediction signal (or prediction block), output by the prediction unit 180 (i.e., by the inter-prediction unit 181 or the intra-prediction unit 182), from the input video signal. The generated residual signal (or residual block) is transmitted to the transform unit 120.

The transform unit 120 generates transform coefficients by applying a transform scheme (e.g., discrete cosine transform (DCT), discrete sine transform (DST), graph-based transform (GBT) or Karhunen-Loeve transform (KLT)) to the residual signal (or residual block). In this case, the transform unit 120 may generate transform coefficients by performing transform using a prediction mode applied to the residual block and a transform scheme determined based on the size of the residual block.

The quantization unit 130 quantizes the transform coefficient and transmits it to the entropy encoding unit 190, and the entropy encoding unit 190 performs an entropy coding operation of the quantized signal and outputs it as a bit stream.

Meanwhile, the quantized signal outputted by the quantization unit 130 may be used to generate a prediction signal. For example, a residual signal may be reconstructed by applying dequatization and inverse transformation to the quantized signal through the dequantization unit 140 and the inverse transform unit 150. A reconstructed signal may be generated by adding the reconstructed residual signal to the prediction signal output by the inter-prediction unit 181 or the intra-prediction unit 182.

Meanwhile, during such a compression process, neighbor blocks are quantized by different quantization parameters. Accordingly, an artifact in which a block boundary is shown may occur. Such a phenomenon is referred to a blocking artifact, which is one of important factors for evaluating image quality. In order to decrease such an artifact, a filtering process may be performed. Through such a filtering process, the blocking artifact is removed and the error of a current picture is decreased at the same time, thereby improving image quality.

The filtering unit 160 applies filtering to the reconstructed signal, and outputs it through a playback device or transmits it to the decoded picture buffer 170. The filtered signal transmitted to the decoded picture buffer 170 may be used as a reference picture in the inter-prediction unit 181. As described above, an encoding rate as well as image quality can be improved using the filtered picture as a reference picture in an inter-picture prediction mode.

The decoded picture buffer 170 may store the filtered picture in order to use it as a reference picture in the inter-prediction unit 181.

The inter-prediction unit 181 performs temporal prediction and/or spatial prediction with reference to the reconstructed picture in order to remove temporal redundancy and/or spatial redundancy. In this case, a blocking artifact or ringing artifact may occur because a reference picture used to perform prediction is a transformed signal that experiences quantization or dequantization in a block unit when it is encoded/decoded previously.

Accordingly, in order to solve performance degradation attributable to the discontinuity of such a signal or quantization, signals between pixels may be interpolated in a sub-pixel unit by applying a low pass filter to the inter-prediction unit 181. In this case, the sub-pixel means a virtual pixel generated by applying an interpolation filter, and an integer pixel means an actual pixel that is present in a reconstructed picture. A linear interpolation, a bi-linear interpolation, a wiener filter, and the like may be applied as an interpolation method.

The interpolation filter may be applied to the reconstructed picture, and may improve the accuracy of prediction. For example, the inter-prediction unit 181 may perform prediction by generating an interpolation pixel by applying the interpolation filter to the integer pixel and by using the interpolated block including interpolated pixels as a prediction block.

The intra-prediction unit 182 predicts a current block with reference to samples neighboring the block that is now to be encoded. The intra-prediction unit 182 may perform the following procedure in order to perform intra-prediction. First, the intra-prediction unit 182 may prepare a reference sample necessary to generate a prediction signal. Furthermore, the intra-prediction unit 182 may generate a prediction signal using the prepared reference sample. Next, the intra-prediction unit 182 may encode a prediction mode. In this case, the reference sample may be prepared through reference sample padding and/or reference sample filtering. A quantization error may be present because the reference sample experiences the prediction and the reconstruction process. Accordingly, in order to reduce such an error, a reference sample filtering process may be performed on each prediction mode used for the intra-prediction.

The prediction signal (or prediction block) generated through the inter-prediction unit 181 or the intra-prediction unit 182 may be used to generate a reconstructed signal (or reconstructed block) or may be used to generate a residual signal (or residual block).

Figure 2:
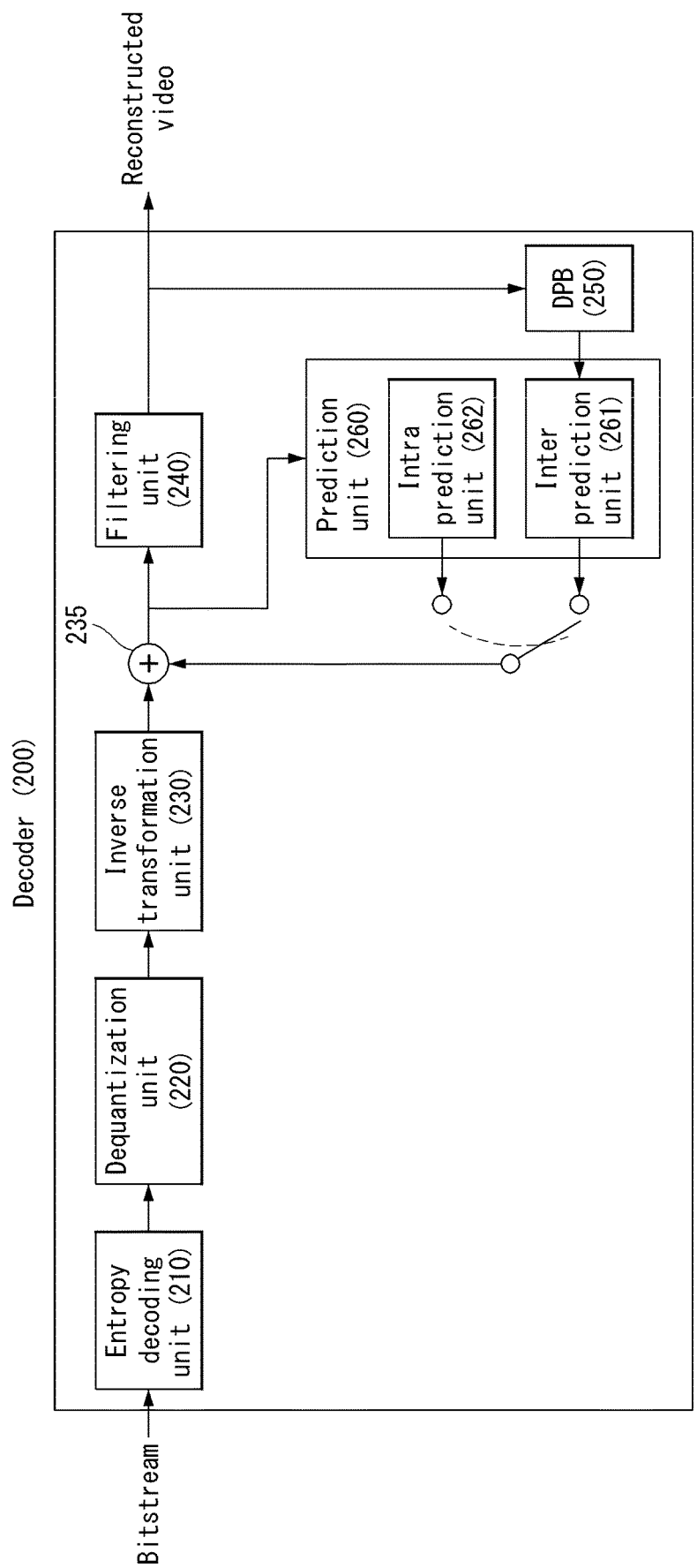
FIG. 2 illustrates a schematic block diagram of a decoder in which decoding of a still image or video signal is performed, as an embodiment to which the present invention is applied.

FIG. 2 illustrates a schematic block diagram of a decoder in which decoding of a still image or video signal is performed, as an embodiment to which the present invention is applied.

Referring to FIG. 2, the decoder 200 may include an entropy decoding unit 210, a dequantization unit 220, an inverse transform unit 230, an adder 235, a filtering unit 240, a decoded picture buffer (DPB) 250 and a prediction unit 260. Furthermore, the prediction unit 260 may include an inter-prediction unit 261 and an intra-prediction unit 262.

Furthermore, a reconstructed video signal output through the decoder 200 may be played back through a playback device.

The decoder 200 receives a signal (i.e., bit stream) output by the encoder 100 shown in FIG. 1. The entropy decoding unit 210 performs an entropy decoding operation on the received signal.

The dequantization unit 220 obtains transform coefficients from the entropy-decoded signal using quantization step size information.

The inverse transform unit 230 obtains a residual signal (or residual block) by inverse transforming the transform coefficients by applying an inverse transform scheme.

The adder 235 adds the obtained residual signal (or residual block) to the prediction signal (or prediction block) output by the prediction unit 260 (i.e., the inter-prediction unit 261 or the intra-prediction unit 262), thereby generating a reconstructed signal (or reconstructed block).

The filtering unit 240 applies filtering to the reconstructed signal (or reconstructed block) and outputs the filtered signal to a playback device or transmits the filtered signal to the decoded picture buffer 250. The filtered signal transmitted to the decoded picture buffer 250 may be used as a reference picture in the inter-prediction unit 261.

In this specification, the embodiments described in the filtering unit 160, inter-prediction unit 181 and intra-prediction unit 182 of the encoder 100 may be identically applied to the filtering unit 240, inter-prediction unit 261 and intra-prediction unit 262 of the decoder, respectively.

In general, a block-based image compression method is used in the compression technique (e.g., HEVC) of a still image or a video. The block-based image compression method is a method of processing an image by splitting it into specific block units, and may decrease memory use and a computational load.

Figure 3:
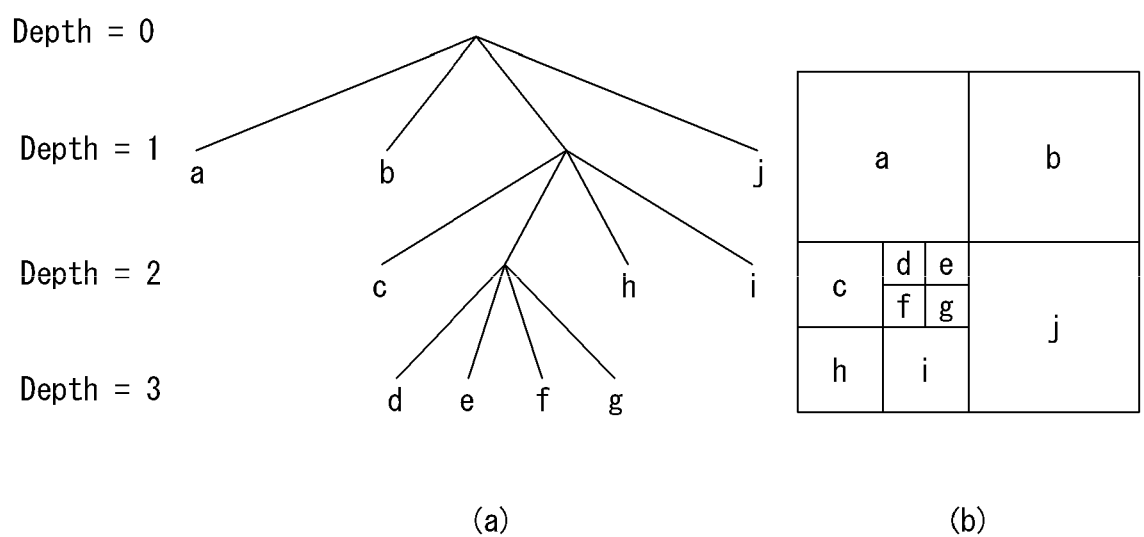
FIG. 3 is a diagram for describing a split structure of a coding unit that may be applied to the present invention.

FIG. 3 is a diagram for describing a split structure of a coding unit which may be applied to the present invention.

An encoder splits a single image (or picture) into coding tree units (CTUs) of a quadrangle form, and sequentially encodes the CTUs one by one according to raster scan order.

In HEVC, a size of CTU may be determined as one of 64×64, 32×32, and 16×16. The encoder may select and use the size of a CTU based on resolution of an input video signal or the characteristics of input video signal. The CTU includes a coding tree block (CTB) for a luma component and the CTB for two chroma components that correspond to it.

One CTU may be split in a quad-tree structure. That is, one CTU may be split into four units each having a square form and having a half horizontal size and a half vertical size, thereby being capable of generating coding units (CUs). Such splitting of the quad-tree structure may be recursively performed. That is, the CUs are hierarchically split from one CTU in the quad-tree structure.

A CU means a basic unit for the processing process of an input video signal, for example, coding in which intra/inter prediction is performed. A CU includes a coding block (CB) for a luma component and a CB for two chroma components corresponding to the luma component. In HEVC, a CU size may be determined as one of 64×64, 32×32, 16×16, and 8×8.

Referring to FIG. 3, the root node of a quad-tree is related to a CTU. The quad-tree is split until a leaf node is reached. The leaf node corresponds to a CU.

This is described in more detail. The CTU corresponds to the root node and has the smallest depth (i.e., depth=0) value. A CTU may not be split depending on the characteristics of an input video signal. In this case, the CTU corresponds to a CU.

A CTU may be split in a quad-tree form. As a result, lower nodes, that is, a depth 1 (depth=1), are generated. Furthermore, a node (i.e., leaf node) that belongs to the lower nodes having the depth of 1 and that is no longer split corresponds to a CU. For example, in FIG. 3(b), a CU(a), a CU(b) and a CU(j) corresponding to nodes a, b and j have been once split from the CTU, and have a depth of 1.

At least one of the nodes having the depth of 1 may be split in a quad-tree form. As a result, lower nodes having a depth 1 (i.e., depth=2) are generated. Furthermore, a node (i.e., leaf node) that belongs to the lower nodes having the depth of 2 and that is no longer split corresponds to a CU. For example, in FIG. 3(b), a CU(c), a CU(h) and a CU(i) corresponding to nodes c, h and i have been twice split from the CTU, and have a depth of 2.

Furthermore, at least one of the nodes having the depth of 2 may be split in a quad-tree form again. As a result, lower nodes having a depth 3 (i.e., depth=3) are generated. Furthermore, a node (i.e., leaf node) that belongs to the lower nodes having the depth of 3 and that is no longer split corresponds to a CU. For example, in FIG. 3(b), a CU(d), a CU(e), a CU(f) and a CU(g) corresponding to nodes d, e, f and g have been three times split from the CTU, and have a depth of 3.

In the encoder, a maximum size or minimum size of a CU may be determined based on the characteristics of a video image (e.g., resolution) or by considering the encoding rate. Furthermore, information about the maximum or minimum size or information capable of deriving the information may be included in a bit stream. A CU having a maximum size is referred to as the largest coding unit (LCU), and a CU having a minimum size is referred to as the smallest coding unit (SCU).

In addition, a CU having a tree structure may be hierarchically split with predetermined maximum depth information (or maximum level information). Furthermore, each split CU may have depth information. Since the depth information represents a split count and/or degree of a CU, it may include information about the size of a CU.

Since the LCU is split in a Quad-tree shape, the size of SCU may be obtained by using a size of LCU and the maximum depth information. Or, inversely, the size of LCU may be obtained by using a size of SCU and the maximum depth information of the tree.

For a single CU, the information (e.g., a split CU flag (split_cu_flag)) that represents whether the corresponding CU is split may be forwarded to the decoder. This split information is included in all CUs except the SCU. For example, when the value of the flag that represents whether to split is '1', the corresponding CU is further split into four CUs, and when the value of the flag that represents whether to split is '0', the corresponding CU is not split any more, and the processing process for the corresponding CU may be performed.

As described above, a CU is a basic unit of the coding in which the intra-prediction or the inter-prediction is performed. The HEVC splits the CU in a prediction unit (PU) for coding an input video signal more effectively.

A PU is a basic unit for generating a prediction block, and even in a single CU, the prediction block may be generated in different way by a unit of PU. However, the intra-prediction and the inter-prediction are not used together for the PUs that belong to a single CU, and the PUs that belong to a single CU are coded by the same prediction method (i.e., the intra-prediction or the inter-prediction).

A PU is not split in the Quad-tree structure, but is split once in a single CU in a predetermined shape. This will be described by reference to the drawing below.

Figure 4:
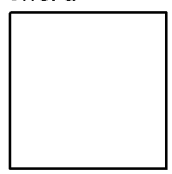
FIG. 4 is a diagram for describing a prediction unit that may be applied to the present invention.
Figure 4:
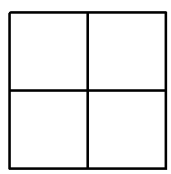
Figure 4:
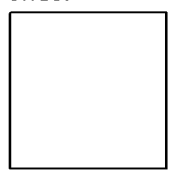
Figure 4:
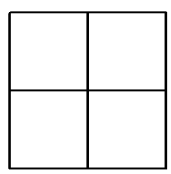
Figure 4:
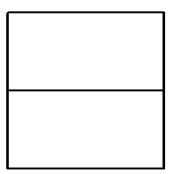
Figure 4:
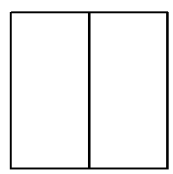
Figure 4:
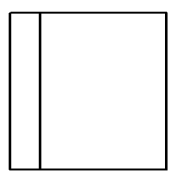
Figure 4:
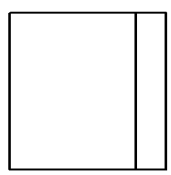
Figure 4:
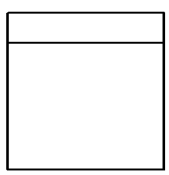
Figure 4:
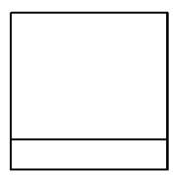

FIG. 4 is a diagram for describing a prediction unit that may be applied to the present invention.

A PU is differently split depending on whether the intra-prediction mode is used or the inter-prediction mode is used as the coding mode of the CU to which the PU belongs.

FIG. 4(a) illustrates a PU if the intra-prediction mode is used, and FIG. 4(b) illustrates a PU if the inter-prediction mode is used.

Referring to FIG. 4(a), assuming that the size of a single CU is 2N×2N (N=4, 8, 16 and 32), the single CU may be split into two types (i.e., 2N×2N or N×N).

In this case, if a single CU is split into the PU of 2N×2N shape, it means that only one PU is present in a single CU.

Meanwhile, if a single CU is split into the PU of N×N shape, a single CU is split into four PUs, and different prediction blocks are generated for each PU unit. However, such PU splitting may be performed only if the size of CB for the luma component of CU is the minimum size (i.e., the case that a CU is an SCU).

Referring to FIG. 4(b), assuming that the size of a single CU is 2N×2N (N=4, 8, 16 and 32), a single CU may be split into eight PU types (i.e., 2N×2N, N×N, 2N×N, N×2N, nL×2N, nR×2N, 2N×nU and 2N×nD)

As in the intra-prediction, the PU split of N×N shape may be performed only if the size of CB for the luma component of CU is the minimum size (i.e., the case that a CU is an SCU).

The inter-prediction supports the PU split in the shape of 2N×N that is split in a horizontal direction and in the shape of N×2N that is split in a vertical direction.

In addition, the inter-prediction supports the PU split in the shape of nL×2N, nR×2N, 2N×nU and 2N×nD, which is an asymmetric motion split (AMP). In this case, 'n' means ¼ value of 2N. However, the AMP may not be used if the CU to which the PU is belonged is the CU of minimum size.

In order to encode the input video signal in a single CTU efficiently, the optimal split structure of the coding unit (CU), the prediction unit (PU) and the transform unit (TU) may be determined based on a minimum rate-distortion value through the processing process as follows. For example, as for the optimal CU split process in a 64×64 CTU, the rate-distortion cost may be calculated through the split process from a CU of 64×64 size to a CU of 8×8 size. The detailed process is as follows.

1) The optimal split structure of a PU and TU that generates the minimum rate distortion value is determined by performing inter/intra-prediction, transformation/quantization, dequantization/inverse transformation and entropy encoding on the CU of 64×64 size.

2) The optimal split structure of a PU and TU is determined to split the 64×64 CU into four CUs of 32×32 size and to generate the minimum rate distortion value for each 32×32 CU.

3) The optimal split structure of a PU and TU is determined to further split the 32×32 CU into four CUs of 16×16 size and to generate the minimum rate distortion value for each 16×16 CU.

4) The optimal split structure of a PU and TU is determined to further split the 16×16 CU into four CUs of 8×8 size and to generate the minimum rate distortion value for each 8×8 CU.

5) The optimal split structure of a CU in the 16×16 block is determined by comparing the rate-distortion value of the 16×16 CU obtained in the process 3) with the addition of the rate-distortion value of the four 8×8 CUs obtained in the process 4). This process is also performed for remaining three 16×16 CUs in the same manner.

6) The optimal split structure of CU in the 32×32 block is determined by comparing the rate-distortion value of the 32×32 CU obtained in the process 2) with the addition of the rate-distortion value of the four 16×16 CUs that is obtained in the process 5). This process is also performed for remaining three 32×32 CUs in the same manner.

7) Finally, the optimal split structure of CU in the 64×64 block is determined by comparing the rate-distortion value of the 64×64 CU obtained in the process 1) with the addition of the rate-distortion value of the four 32×32 CUs obtained in the process 6).

In the intra-prediction mode, a prediction mode is selected as a PU unit, and prediction and reconstruction are performed on the selected prediction mode in an actual TU unit.

A TU means a basic unit in which actual prediction and reconstruction are performed. A TU includes a transform block (TB) for a luma component and a TB for two chroma components corresponding to the luma component.

In the example of FIG. 3, as in an example in which one CTU is split in the quad-tree structure to generate a CU, a TU is hierarchically split from one CU to be coded in the quad-tree structure.

TUs split from a CU may be split into smaller and lower TUs because a TU is split in the quad-tree structure. In HEVC, the size of a TU may be determined to be as one of 32×32, 16×16, 8×8 and 4×4.

Referring back to FIG. 3, the root node of a quad-tree is assumed to be related to a CU. The quad-tree is split until a leaf node is reached, and the leaf node corresponds to a TU.

This is described in more detail. A CU corresponds to a root node and has the smallest depth (i.e., depth=0) value. A CU may not be split depending on the characteristics of an input image. In this case, the CU corresponds to a TU.

A CU may be split in a quad-tree form. As a result, lower nodes having a depth 1 (depth=1) are generated. Furthermore, a node (i.e., leaf node) that belongs to the lower nodes having the depth of 1 and that is no longer split corresponds to a TU. For example, in FIG. 3(b), a TU(a), a TU(b) and a TU(j) corresponding to the nodes a, b and j are once split from a CU and have a depth of 1.

At least one of the nodes having the depth of 1 may be split in a quad-tree form again. As a result, lower nodes having a depth 2 (i.e., depth=2) are generated. Furthermore, a node (i.e., leaf node) that belongs to the lower nodes having the depth of 2 and that is no longer split corresponds to a TU. For example, in FIG. 3(b), a TU(c), a TU(h) and a TU(i) corresponding to the node c, h and l have been split twice from the CU and have the depth of 2.

Furthermore, at least one of the nodes having the depth of 2 may be split in a quad-tree form again. As a result, lower nodes having a depth 3 (i.e., depth=3) are generated. Furthermore, a node (i.e., leaf node) that belongs to the lower nodes having the depth of 3 and that is no longer split corresponds to a CU. For example, in FIG. 3(b), a TU(d), a TU(e), a TU(f) and a TU(g) corresponding to the nodes d, e, f and g have been three times split from the CU and have the depth of 3.

A TU having a tree structure may be hierarchically split with predetermined maximum depth information (or maximum level information). Furthermore, each spit TU may have depth information. The depth information may include information about the size of the TU because it indicates the split number and/or degree of the TU.

Information (e.g., a split TU flag "split_transform_flag") indicating whether a corresponding TU has been split with respect to one TU may be transferred to the decoder. The split information is included in all of TUs other than a TU of a minimum size. For example, if the value of the flag indicating whether a TU has been split is "1", the corresponding TU is split into four TUs. If the value of the flag indicating whether a TU has been split is "0", the corresponding TU is no longer split.

Prediction

In order to reconstruct a current processing unit on which decoding is performed, the decoded part of a current picture including the current processing unit or other pictures may be used.

A picture (slice) using only a current picture for reconstruction, that is, performing only intra-prediction, may be referred to as an intra-picture or I picture (slice). A picture (slice) using the greatest one motion vector and reference index in order to predict each unit may be referred to as a predictive picture or P picture (slice). A picture (slice) using a maximum of two motion vectors and reference indices in order to predict each unit may be referred to as a bi-predictive picture or B picture (slice).

Intra-prediction means a prediction method of deriving a current processing block from a data element (e.g., sample value, etc.) of the same decoded picture (or slice). That is, intra-prediction means a method of predicting a pixel value of the current processing block with reference to reconstructed regions within a current picture.

Inter-prediction means a prediction method of deriving a current processing block based on a data element (e.g., sample value or motion vector) of a picture other than a current picture. That is, inter-prediction means a method of predicting the pixel value of the current processing block with reference to reconstructed regions within another reconstructed picture other than a current picture.

Hereinafter, intra-prediction is described in more detail.

Intra Prediction

Figure 5:
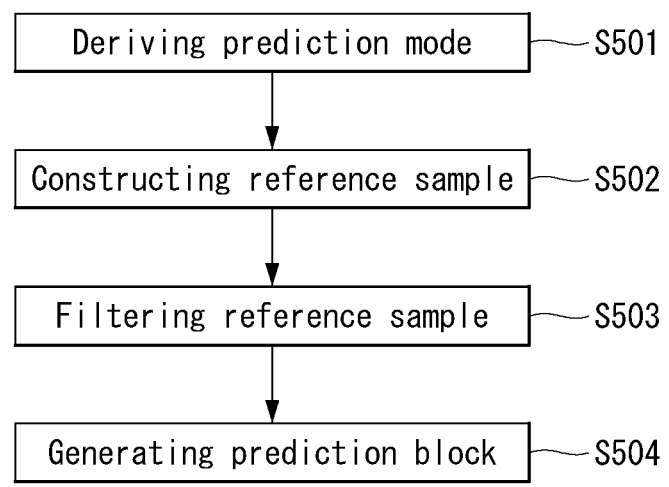
FIG. 5 is an embodiment to which the present invention is applied and is a diagram illustrating an intra-prediction method.

FIG. 5 is an embodiment to which the present invention is applied and is a diagram illustrating an intra-prediction method.

Referring to FIG. 5, the decoder derives an intra-prediction mode of a current processing block (S501).

An intra-prediction mode may have a prediction direction for the location of a reference sample used for prediction depending on a prediction mode. An intra-prediction mode having a prediction direction is called an intra-angular prediction mode (Intra_Angular prediction mode). In contrast, an intra-prediction mode not having a prediction direction includes an intra-planar (INTRA_PLANAR) prediction mode and an intra-DC (INTRA_DC) prediction mode.

Figure 6:
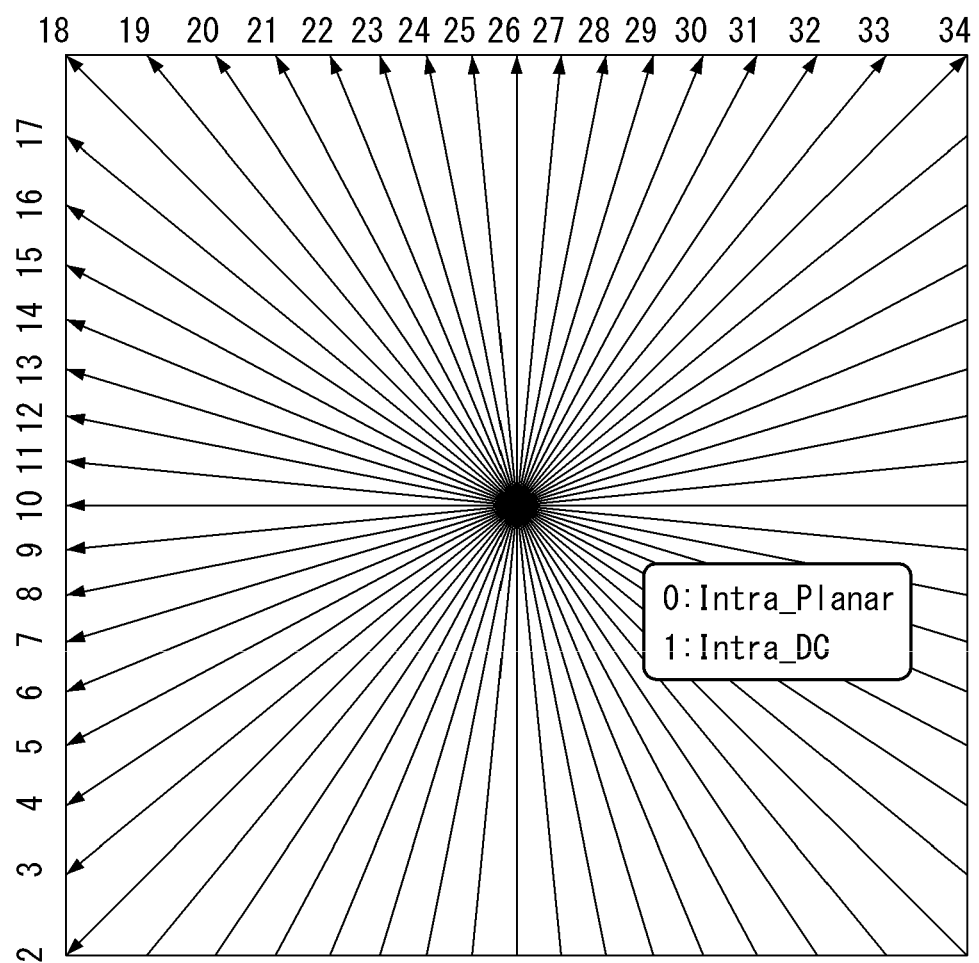
FIG. 6 illustrates a prediction direction according to an intra-prediction mode.

Table 1 illustrates intra-prediction modes and associated names, and FIG. 6 illustrates a prediction direction according to an intra-prediction mode.

TABLE 1

| Intra prediction mode | Associated name |
| --- | --- |
| 0 | INTRA_PLANAR |
| 1 | INTRA_DC |
| 2 . . . 34 | INTRA_ANGULAR2 . . . INTRA_ANGULAR34 |

In intra-prediction, prediction is performed on a current processing block based on a derived prediction mode. A reference sample used for prediction and a detailed prediction method are different depending on a prediction mode. If a current block is an intra-prediction mode, the decoder derives the prediction mode of a current block in order to perform prediction.

The decoder checks whether neighboring samples of the current processing block can be used for prediction and constructs reference samples to be used for the prediction (S502).

In intra-prediction, neighboring samples of the current processing block mean a sample neighboring the left boundary of current processing block of an nS×nS size, a total of 2×nS samples neighboring a bottom left of the current processing block, a sample neighboring the top boundary of the current processing block, a total of 2×nS samples neighboring the top right of the current processing block, and one sample neighboring the top left of the current processing block.

However, some of the neighboring samples of the current processing block have not yet been coded or may not be available. In this case, the decoder may construct reference samples to be used for prediction by substituting unavailable samples with available samples.

The decoder may perform filtering on the reference samples based on the intra-prediction mode (S503).

Whether or not to perform the filtering of the reference samples may be determined based on the size of the current processing block. Furthermore, the filtering method of the reference samples may be determined based on a filtering flag transferred by the encoder.

The decoder generates a prediction block for the current processing block based on the intra-prediction mode and the reference samples (S504). That is, the decoder generates a prediction block (i.e., generates a prediction sample) for the current processing block based on the intra-prediction mode derived in the step S501 of deriving an intra-prediction mode and the reference samples obtained through the reference sample construction step S502 and the reference sample filtering step S503.

If the current processing block has been encoded in the INTRA_DC mode, in order to minimize the discontinuity of a boundary between processing blocks, a sample at the left boundary of a prediction block (i.e., a sample within a prediction block neighboring the left boundary) and a sample at the top boundary of the prediction block (i.e., a sample within a prediction block neighboring the top boundary) may be filtered at step S504.

Furthermore, at step S504, with respect to the vertical mode and horizontal mode of intra-angular prediction modes, as in the INTRA_DC mode, filtering may be applied to the left boundary sample or the top boundary sample.

This is described in more detail. If a current processing block has been encoded in the vertical mode or horizontal mode, the value of a prediction sample may be derived based on a reference sample located in a prediction direction. In this case, a boundary sample that belongs to the left boundary sample and top boundary sample of a prediction block and that is not located in the prediction direction may neighbor a reference sample not used for prediction. That is, the distance from the reference sample not used for prediction may be much closer than the distance from a reference sample used for prediction.

Accordingly, the decoder may adaptively apply filtering to left boundary samples or top boundary samples depending on whether an intra-prediction direction is vertical or horizontal. That is, if the intra-prediction direction is vertical, the decoder may apply filtering to the left boundary samples. If the intra-prediction direction is horizontal, the decoder may apply filtering to the top boundary samples.

Most Probable Mode

In HEVC, in order to represent (signal) such 35 types of prediction modes with less bits, a statistical property of the intra-prediction mode is used.

Generally, since a coding block has the similar image property to a neighboring block, it is highly probable that the coding block has an intra-prediction mode which is the same as or similar to the intra-prediction mode of the neighboring block. Considering such a property, based on the intra-prediction mode of a left PU and an upper PU of a current PU, a prediction mode of the current PU is encoded. In this case, an encoder/decoder determines a prediction mode of a neighboring block and a most frequently generated prediction mode generally to be a Most Probable Mode (MPM mode).

If the prediction mode of the current PU is determined to be an MPM mode, a bit used for representing a prediction mode may be saved (represented within two bits). If the prediction mode of the current PU is determined to be different prediction mode which is not an MPM mode, since the prediction mode is encoded with a mode of 32 modes except three MPM modes, an intra-prediction mode may be represented using 5 bits, not 6 bits.

Figure 7:
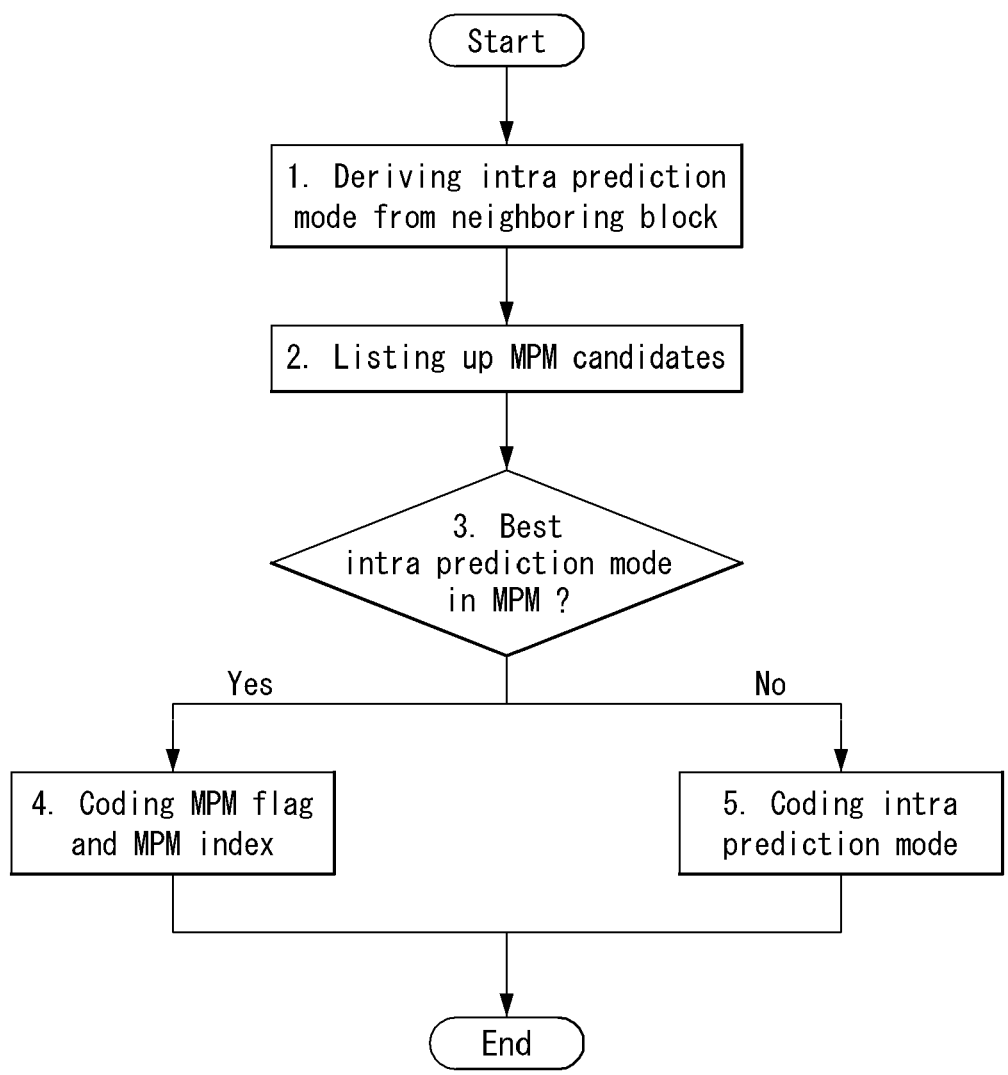
FIG. 7 is a diagram illustrating an intra prediction mode encoding method according to an embodiment of the present invention.

FIG. 7 is a diagram illustrating an intra prediction mode encoding method according to an embodiment of the present invention.

1. If a neighboring block is intra-coded first, an encoder may derive intra prediction mode information of the neighboring block.

2. The encoder lists up most probable modes (MPM) candidates (or MPM lists) using the intra prediction mode information of the neighboring block.

In intra-picture coding, loss of overlapping information is prevented by considering similarity between the neighboring block and a current coding block, thereby increasing the coding efficiency. This method may also be used for encoding mode information transmission, which is referred to as most probable modes (MPM).

Since the neighboring block is located in the immediate vicinity of the current block, there is a high probability that intra prediction modes are similar to each other. Therefore, a current encoding mode may be expressed using a mode of the neighboring block.

At this time, the neighboring block may utilize a block adjacent to a left most likely to be used in decoding the current block (which is most likely to be already decoded), a block adjacent to a top-left, a block adjacent to a bottom-left, a block adjacent to a top, a block adjacent to a top-right, etc.

If the MPM is not satisfied using three MPMs in an existing 35 intra prediction modes, an intra-picture prediction mode is encoded using 5 bits (35−3=32).

At this time, if the intra prediction mode of the block adjacent to the left and the intra prediction mode of the block adjacent to the top are not the same, a first MPM candidate may be determined as the intra prediction mode of the block adjacent to the left, a second MPM candidate may be determined as the intra prediction mode of the block adjacent to the top, a third MPM candidate may be determined as one of a planar mode, a DC mode, or an intra vertical mode.

If the intra prediction mode of the block adjacent to the left and the intra prediction mode of the block adjacent to the top are the same, and if the corresponding overlapping mode is less than 2 (i.e., the planar mode or the DC mode, see Table 1), the first MPM candidate may be determined as the planar mode, the second MPM candidate may be determined as the DC mode, the third MPM candidate may be determined as the vertical mode (e.g., mode 26 in FIG. 6).

If the intra prediction mode of the block adjacent to the left and the intra prediction mode of the block adjacent to the top are the same, and if the corresponding overlapping mode is not less than 2, the first MPM candidate may be determined as an overlapping intra prediction mode, the second MPM candidate and the third MPM candidate may be determined as two modes adjacent to the overlapping intra prediction mode.

3. The encoder determines whether the best intra prediction mode to be applied to the current block belongs to the MPM candidate constructed as described above.

4. If the intra prediction mode of the current block belongs to the MPM candidate, the encoder codes an MPM flag and an MPM index.

Here, the MPM flag may indicate whether the intra prediction mode of the current block is derived from a neighboring intra prediction block (i.e., the intra prediction mode of the current block belongs to the MPM).

In addition, the MPM index may indicate which MPM mode is applied as the intra prediction mode of the current block among the MPM candidates constructed in step 2 above.

5. On the other hand, if the intra prediction mode of the current block does not belong to the MPM candidate, the encoder codes the intra prediction mode of the current block.

Figure 8:
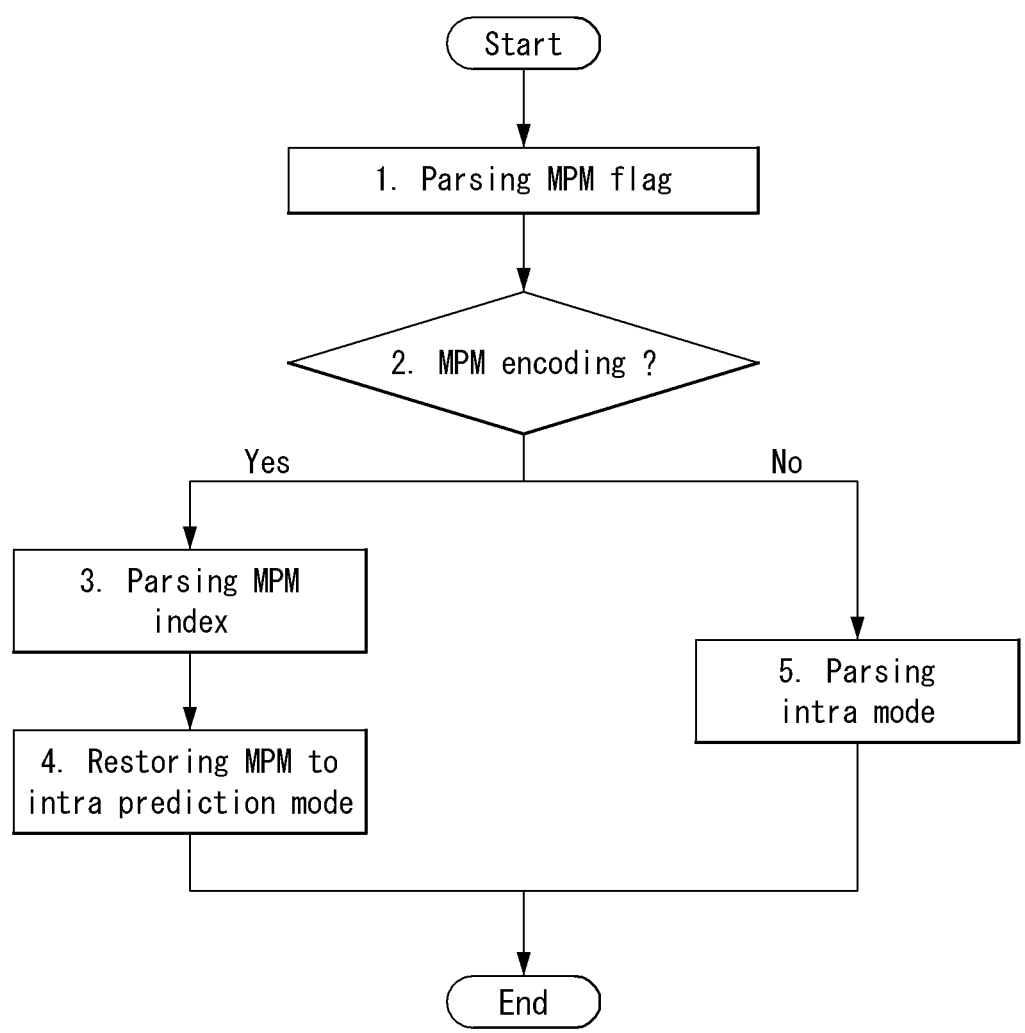
FIG. 8 illustrates an intra prediction mode decoding method according to an embodiment to which the present invention can be applied.

FIG. 8 illustrates an intra prediction mode decoding method according to an embodiment to which the present invention can be applied.

1. A decoder parses an MPM flag.

2. The decoder parses the MPM flag to confirm whether MPM encoding is applied to a current block.

That is, the decoder confirms whether the intra prediction mode of the current block belongs to the MPM candidate composed of the mode of the intra-predicted block of the neighboring block.

3. If MPM encoding is applied to the current block, the decoder parses an MPM index.

4. The decoder may then restore the MPM mode indicated by the MPM index to the intra prediction mode for the current block.

5. On the other hand, if the MPM encoding is not applied to the current block, the decoder parses the intra prediction mode for the current block.

A detailed method for determining an MPM mode is described with reference to the drawings below.

Figure 9:
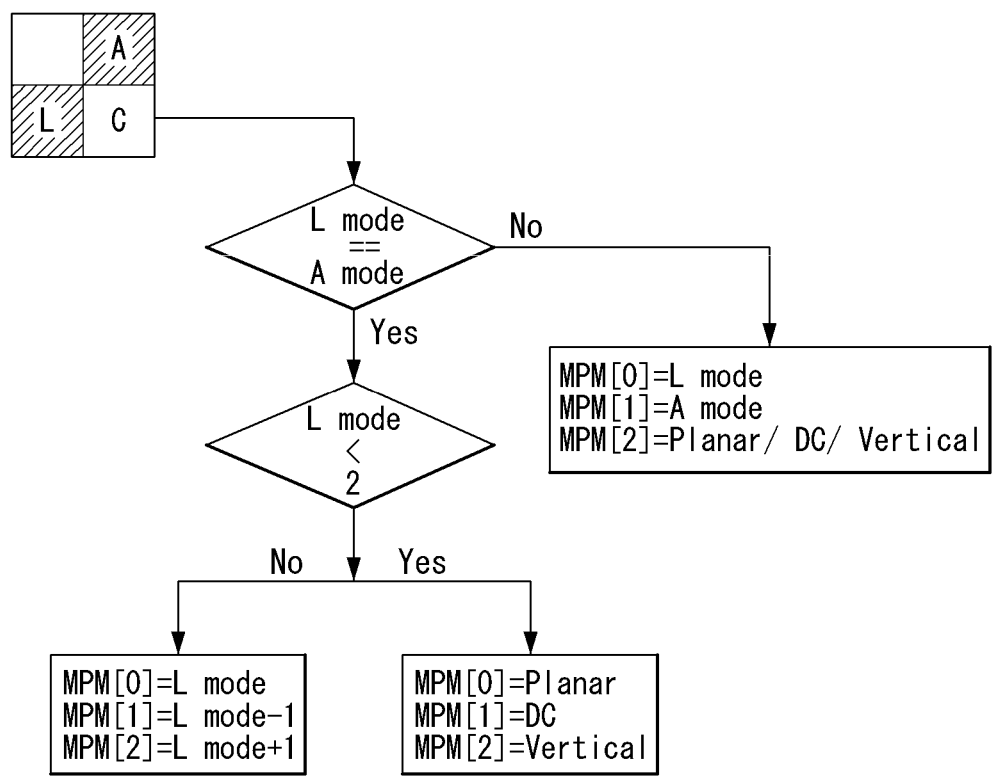
FIG. 9 is a diagram for describing a method for determining an MPM mode as an embodiment to which the present invention is applied.

FIG. 9 is a diagram for describing a method for determining an MPM mode as an embodiment to which the present invention is applied.

1. A decoder determines whether a prediction mode adjacent to a left side of a current block (hereinafter, referred to as 'L mode') and a prediction mode adjacent to an upper side of the current block (hereinafter, referred to as 'A mode') are identical.

2. In the case that L mode and A mode are different, the decoder determines the first MPM mode (MPM[0]) and the second MPM mode (MPM[1]) to L mode and A mode, respectively, and set the last MPM mode (MPM[2]) to a mode, which is not L mode and A mode, among a planar mode, DC and a vertical mode.

3. In the case that L mode and A mode are identical, the decoder determines whether a prediction mode of L mode is smaller than 2 (refer to FIG. 6 above).

4. In the case that L mode is not smaller than 2, the decoder set MPM[0], MPM[1] and MPM[2] to L mode, L mode−1 and L mode+1, respectively.

5. In the case that L mode is smaller than 2, the decoder set MPM[0], MPM[1] and MPM[2] to planar, DC and vertical mode, respectively.

As described above, in HEVC, a prediction block of a current block is generated using total 35 types of prediction methods including 33 types of directional prediction methods and 2 types of non-directional prediction methods for an intra-prediction.

In the case of 33 types of directional prediction methods, when a prediction sample is calculated from reference samples, considering each directionality, a reference sample value is copied to a corresponding prediction sample.

In other words, in 33 types of directional prediction methods, for predicting a current block, a prediction sample is generated using a neighboring reference sample (upper reference samples and left reference samples), and then, the generated prediction sample is copied according to the prediction directionality.

Recently, it has been discussed a method for performing an intra-prediction using total 67 intra-prediction modes by extending 33 directional prediction modes of HEVC to 65 directional prediction modes and adding the existing non-directional prediction mode.

Figure 10:
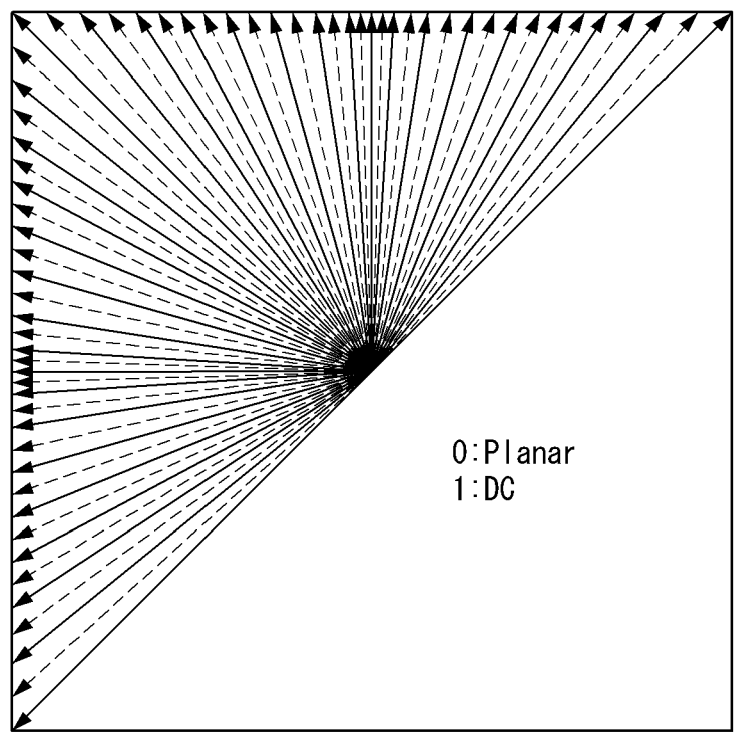
FIG. 10 is a diagram illustrating a prediction direction according to an intra-prediction mode as an embodiment to which the present invention may be applied.

FIG. 10 is a diagram illustrating a prediction direction according to an intra-prediction mode as an embodiment to which the present invention may be applied.

Referring to FIG. 10, it is identified a prediction direction according to 67 intra-prediction modes. As described above, 67 intra-prediction modes may include 65 directional modes and 2 non-directional mode. In this case, the prediction mode denoted by a dotted line is the prediction direction which is added to the existing HEVC prediction mode.

In each angular prediction mode of the existing HEVC, a prediction sample may be generated through a linear interpolation of two integer pixels in $\frac{1}{32}$-pixel unit according to each angular of a current intra-prediction mode.

According to the method for performing an intra-prediction using total 67 intra-prediction modes recently discussed, a prediction sample may be generated in $\frac{1}{64}$-pixel unit through additional interpolation using two prediction pixels of $\frac{1}{32}$-pixel unit. Through this, a resolution of the prediction direction increases in comparison with the existing intra-prediction method.

As such, the increase of resolution of the intra-prediction direction enables more accurate prediction and decreases distortion, but there is a disadvantage that it is required overhead bit for signaling the increased prediction modes.

In addition, together with the method of extending the number of intra-prediction modes to 67, recently, it has been discussed a method of using 6 MPM candidate lists, not the existing 3 MPM candidate lists in an MPM mode.

In this case, a detailed method of determining 6 MPM modes is described with reference to the drawing below.

Figure 11:
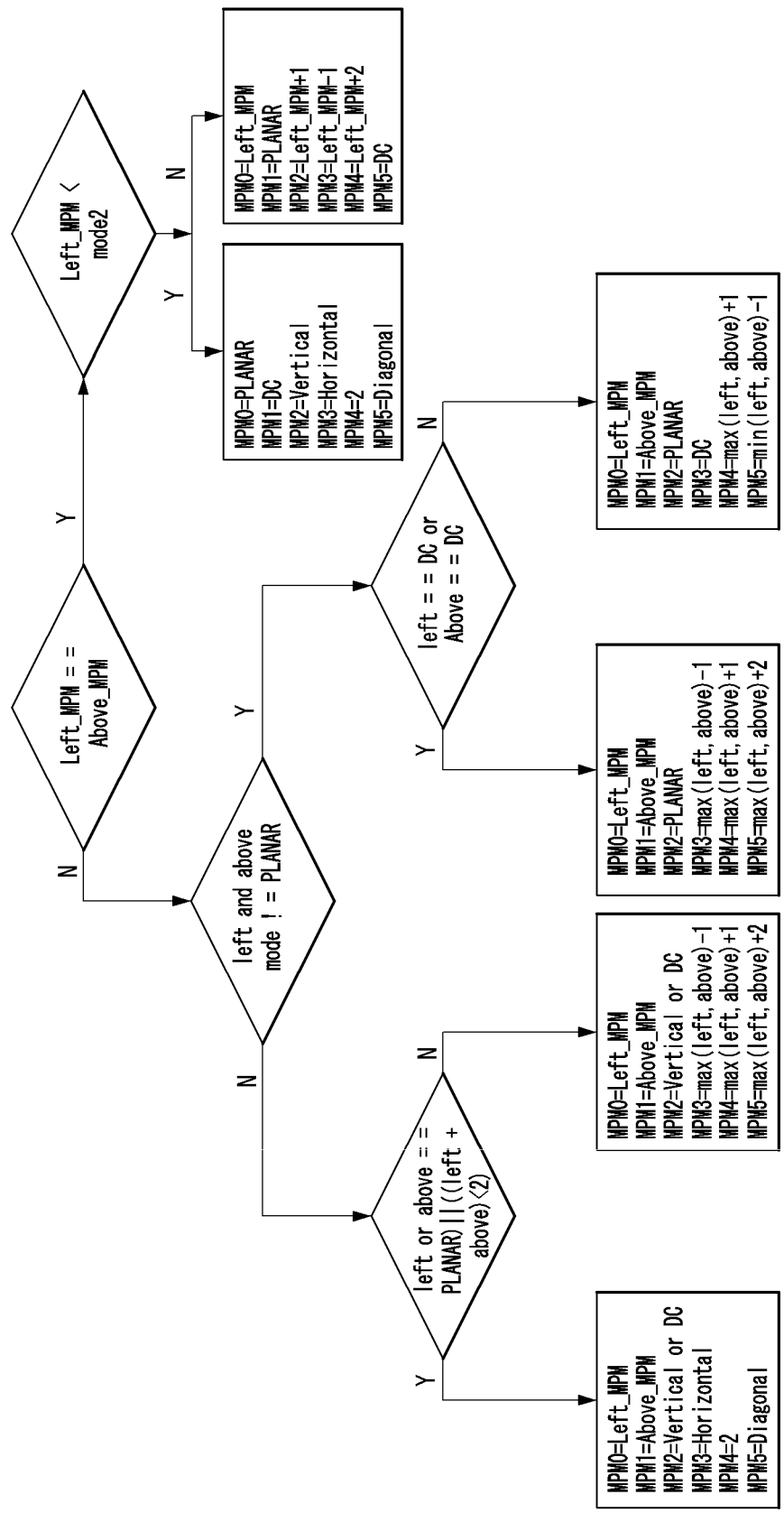
FIG. 11 is a diagram illustrating a method for determining an MPM mode as an embodiment to which the present invention may be applied.

FIG. 11 is a diagram illustrating a method for determining an MPM mode as an embodiment to which the present invention may be applied.

1. A decoder determines whether a prediction mode adjacent to a left side of a current block (hereinafter, referred to as 'L mode') and a prediction mode adjacent to an upper side of the current block (hereinafter, referred to as 'A mode') are identical.

2. In the case that L mode and A mode are different, the decoder determines whether L mode and A mode are planar mode or not.

3. In the case that L mode and A mode are planar mode, the decoder determines whether a sum of L mode and A mode is smaller than 2.

4. In the case that the sum of L mode and A mode is smaller than 2, the decoder set MPM[0], MPM[1], MPM[2], MPM[3], MPM[4] and MPM[5] to L mode, A mode, vertical direction or DC mode, horizontal direction mode, the second mode and diagonal mode, respectively.

5. In the case that the sum of L mode and A mode is not smaller than 2, the decoder set MPM[0], MPM[1], MPM[2], MPM[3], MPM[4] and MPM[5] to L mode, A mode, vertical direction or DC mode, a greater mode−1 between L mode and A mode, a greater mode+1 between L mode and A mode and a greater mode+2 between L mode and A mode, respectively.

6. In the case that L mode and A mode are planar mode, the decoder determines whether L mode is DC mode or A mode is DC mode.

7. In the case that L mode or A mode is DC mode, the decoder set MPM[0], MPM[1], MPM[2], MPM[3], MPM[4] and MPM[5] to L mode, A mode, planar mode, a greater mode−1 between L mode and A mode, a greater mode+1 between L mode and A mode and a greater mode+2 between L mode and A mode, respectively.

8. In the case that L mode or A mode is not DC mode, the decoder set MPM[0], MPM[1], MPM[2], MPM[3], MPM[4] and MPM[5] to L mode, A mode, planar mode, DC mode, a greater mode+1 between L mode and A mode and a greater mode−1 between L mode and A mode, respectively.

9. In the case that L mode or A mode are identical, the decoder determines whether L mode is smaller than 2.

10. In the case that L mode is smaller than 2, the decoder set MPM[0], MPM[1], MPM[2], MPM[3], MPM[4] and MPM[5] to planar mode, DC mode, vertical direction mode, horizontal direction mode, the second mode and diagonal mode, respectively.

11. In the case that L mode is not smaller than 2, the decoder the decoder set MPM[0], MPM[1], MPM[2], MPM[3], MPM[4] and MPM[5] to L mode, planar mode, L mode+1, L mode−1, L mode+2 and DC mode.

Image Processing Method Based on Intra-Prediction Mode

The number of modes of prediction within picture (or intra-prediction modes) is increased, and a prediction direction is subdivided, and accordingly, more accurate prediction becomes available, but a bit for representing the intra-prediction mode is increased as the number of intra-prediction modes is increased, and accordingly, there is a problem that encoding rate becomes degraded.

In the present invention, in order to solve the problem, it is proposed a method of decoding an intra-prediction mode using an intra prediction mode set in which resolution is different.

Here, the intra prediction mode set (hereinafter, referred to as 'prediction mode set') means a set of intra-prediction mode including a plurality of intra-prediction modes. In addition, the resolution means a degree (or density) of distribution of the intra-prediction mode that represents a prediction direction in the prediction mode set. At this time, the degree of distribution may represent a spacing between prediction directions that partition the entire directionality which is used in the intra-prediction. That is, the prediction mode set having relatively high resolution has high degree of distribution and the spacing between prediction directions may be small, and the prediction mode set having relatively low resolution has low degree of distribution and the spacing between prediction directions may be relatively great.

Particularly, in the present invention, it is proposed a method of determining a single prediction mode set in explicitly method or in implicit method among a plurality of intra-prediction mode sets, deriving an intra-prediction mode in the determined prediction mode set, and performing the intra-prediction.

In addition, in the present invention, it is proposed a method of performing an intra-prediction by adaptively determining different prediction mode sets of which resolutions are different with each other in a block.

Hereinafter, in the detailed description of the embodiments of the present invention, for the convenience of description, the number of intra-prediction modes to which the present invention may be applied is described by exemplifying 35 types of intra-prediction modes of the existing HEVC and the 67 intra-prediction modes described above frequently, but the present invention is not limited to the exemplified number of intra-prediction modes.

First Embodiment

In this embodiment, it is proposed a method of determining a prediction mode set in explicitly method or in implicit method, deriving an intra-prediction mode in the determined prediction mode set, and performing the intra-prediction.

The intra-prediction mode is signaled to a decoder using a plurality of intra-prediction mode sets of which resolutions are different, and a bit for transmitting an intra-prediction mode is saved and encoding performance may be improved.

Particularly, an encoder/decoder may determine a prediction mode set used in an intra-prediction of a current block among a plurality of prediction mode sets and perform a prediction by deriving the intra-prediction mode applied to a current block in the determined prediction mode set. This will be described in detail with reference to the drawing below.

Figure 12:
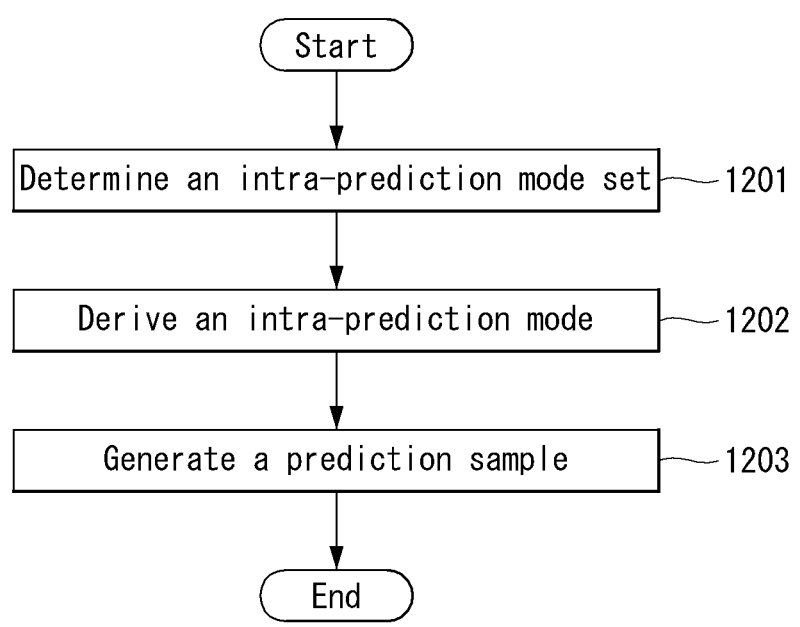
FIG. 12 is a diagram illustrating an intra-prediction method according to an embodiment of the present invention.

FIG. 12 is a diagram illustrating an intra-prediction method according to an embodiment of the present invention.

An encoder/decoder determines an intra-prediction mode set used in an intra-prediction of a current prediction processing unit among a plurality of intra prediction mode sets having different resolutions (step, S1201).

Here, the intra prediction mode sets may have one or more intra-prediction modes, respectively. In addition, the prediction processing unit may be a unit of block or a unit of pixel.

At this time, the prediction mode set used for the intra-prediction may include as below.

The encoder/decoder may configure a set (i.e., prediction mode set) P_0 of the intra-prediction mode and configure a prediction mode set P_1 of which resolution is increased in comparison with P_0. In the same way, the encoder/decoder may configure a set P_r (r>=1) of the intra-prediction mode of which resolution is increased.

At this time, P_m may correspond to a subset of P_(m+n) (here, m and n are integers greater than or equal to 0). For example, P_0 may include 33 types of directional prediction modes, DC mode and planar mode, and P_1 may include 65 types of directional prediction modes, DC mode and planar mode.

In addition, for example, P_0 may include 33 types of directional prediction modes and P_1 may include 65 types of directional prediction modes except P_0 or including P_0.

Furthermore, for example, P_0 may include vertical, horizontal or directional prediction mode which is frequently selected statistically, P_1 may include 33 types of directional prediction modes except P_0 or including P_0, and P_2 may include 65 types of directional prediction modes except P_0 and/or P1 or including P_0 and/or P1.

The prediction mode set may be determined by the decoder using explicitly method or in implicit method. The method of determining the prediction mode set will be described in detail below.

The encoder/decoder derives an intra-prediction mode applied to a current block in the prediction mode set which is determined in step S1201 (step, S1202).

The encoder may transmit index information for indicating the intra-prediction mode applied to the current block in the prediction mode set which is determined in step S1201. In addition, the decoder may derive the intra-prediction mode applied to the current block based on the intra-prediction mode which is derived in step S1202.

The encoder/decoder generates a prediction sample of the current block based on the intra-prediction mode which is derived in step S1202 (step, S1203).

In the case that a directional prediction method is applied, the encoder/decoder may generate a prediction sample from one or two reference samples which are determined according to the prediction direction of the intra-prediction mode of the current block.

In the case that a non-directional prediction method is applied, the encoder/decoder may generate a prediction sample by performing a weighted sum of average values of neighboring reference sample or neighboring reference sample.

As described above, the prediction mode set may be determined using explicitly method or in implicit method. First, a method of determining a prediction mode set explicitly is described.

The method of determining explicitly includes a method for an encoder to determine a prediction mode set (or resolution of a prediction mode set) used in the intra-prediction of the current block and signal the determined prediction mode set (or resolution of a prediction mode set) to a decoder.

That is, the decoder may determine a prediction mode set (or resolution of a prediction mode set) from syntax indicating the prediction mode set (or resolution of a prediction mode set) used for the intra-prediction of the current block among a plurality of prediction mode sets.

For example, the encoder may signal the resolution of the prediction mode set in a unit of a sequence (or Sequence Parameter Set (SPS)), a slice, a CTU, a CU or a PU.

In other words, the syntax indicating the resolution of a prediction mode set may be positioned in a Sequence Parameter Set (SPS), a slice, a CTU, a CU or a PU.

In addition, for example, the encoder may signal the resolution of a prediction mode set conditionally according to a size, a prediction mode and a statistical property in a unit of a sequence, a slice, a CTU, a CU or a PU.

In other words, the syntax indicating the resolution of a prediction mode set may be positioned conditionally according to a size, a prediction mode and a statistical property in a unit of a sequence, a slice, a CTU, a CU or a PU.

In addition, in the case that syntax is not existed or not signaled from the encoder, a specific prediction mode set may be determined as a default prediction mode set. For example, as a default prediction mode set, 35 prediction mode sets, or 67 prediction mode sets may be determined.

Hereinafter, a method of determining a prediction mode set implicitly is described. A prediction mode set may be determined in the method below.

An encoder/decoder may determine a prediction mode set used for a current block by using information which is previously decoded.

The encoder/decoder may determine a prediction mode set used for the current block by using a residual signal of the current block or a transform coefficient in which the residual signal is transformed to frequency domain.

The encoder and the decoder may determine a prediction mode set using the same method. The encoder may determine an intra-prediction mode applied to the current block in the determined prediction mode set and transmit the determined prediction mode set to the decoder. At this time, the encoder may indicate the intra-prediction mode applied to the current block in the prediction mode set using index information.

The encoder/decoder may determine a prediction mode set used for a prediction of the current block using information which is previously decoded. For example, the encoder/decoder may determine a prediction mode set using a sample neighboring the current block. This is described with reference to the drawing below.

Figure 13:
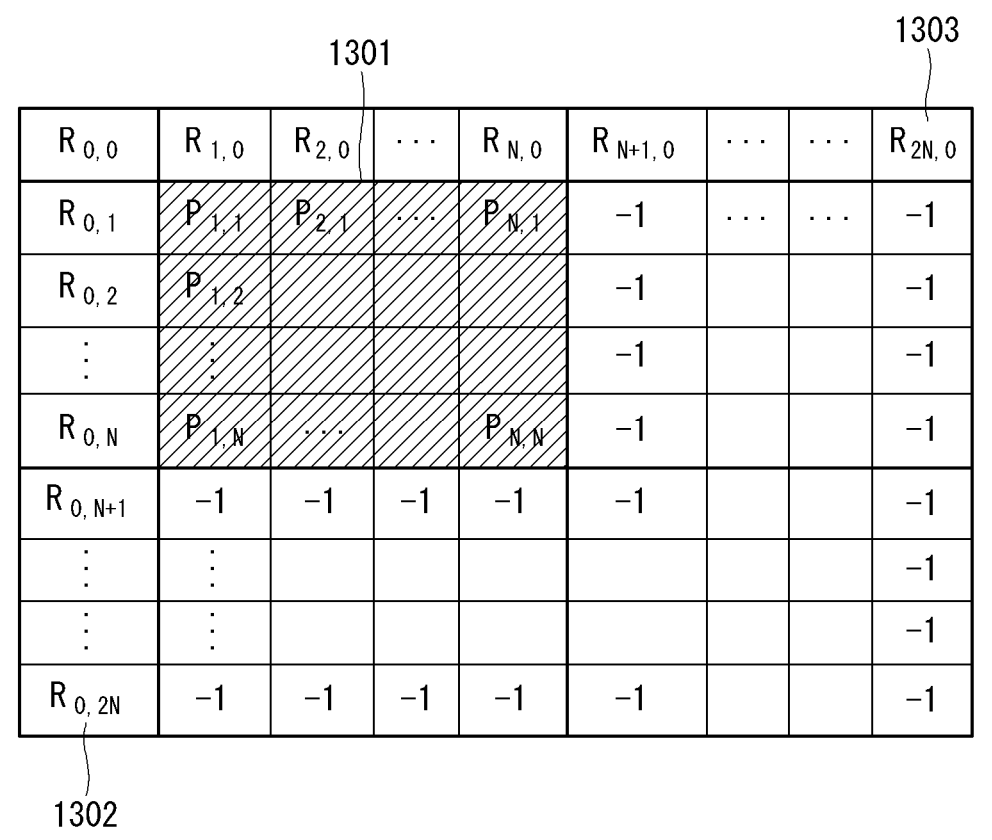

FIG. 13 is a diagram for describing a method for determining an intra-prediction mode set according to an embodiment of the present invention.

Referring to FIG. 13, a sample neighboring a current block 1301 of N×N size (or neighboring reference sample) may include total (4N+1) reference samples from R_(0, 2N) 1302 to R_(2N, 0) 1303 positions. An encoder/decoder may determine a prediction mode set used for an intra-prediction of the current block 1301 using the reference sample neighboring the current block 1301.

Particularly, the encoder/decoder may estimate a degree of complexity of the current block 1301 using the reference sample neighboring the current block 1301 and determine a prediction mode set used for an intra-prediction of the current block 1301 from the estimated result.

In other words, the encoder/decoder may categorize whether the current block 1301 is simple or complex from the neighboring reference sample and according to the categorization result, determine a prediction mode set having different resolutions with each other and use it for an intra-prediction.

The 'simple' for an image may mean that the image has little details or textures, is homogenous, smooth and has much low frequency components in frequency domain. In addition, the 'complex' for an image may mean that the image has much details or textures, is heterogenous, and has much high frequency components in frequency domain.

That is, in the case that the current block 1301 is simple (i.e., the case that a degree of complexity is low), a bit for representing an intra-prediction mode is saved using a prediction mode set having low resolution, and in the case that the current block 1301 is complex (i.e., the case that a degree of complexity is high), an accuracy of prediction is improved by using a prediction mode set having high resolution, and accordingly, encoding performance may be improved.

The encoder/decoder may estimate (or categorize) whether the current block 1301 is simple or complex using various methods and determine a prediction mode set (or resolution of a prediction mode set).

As a first method, the encoder/decoder may estimate a degree of complexity of the current block 1301 by calculating a variance value of the neighboring reference sample and determine a resolution of a prediction mode set used for a prediction of the current block 1301.

For example, the encoder/decoder may calculate a variance value of the entire reference samples neighboring the current block 1301 or a variance value of some reference samples among reference samples neighboring the current block 1301 and determine a resolution of a prediction mode set by comparing it with a threshold value.

That is, in the case that the variance value is greater than the threshold value, the encoder/decoder may use the prediction mode set having high resolution for a prediction of the current block. On the other hand, in the case that the variance value is smaller than the threshold value, the encoder/decoder may use the prediction mode set having low resolution for a prediction of the current block.

As a second method, the encoder/decoder may determine a degree of discontinuity of a sample value of neighboring reference samples, and by using this, determine a resolution of the prediction mode set.

For example, the encoder/decoder may calculate a differential of a sample value between two adjacent reference samples among the reference samples neighboring the current block 1301. In the case that an absolute value of the differential which is greater than the threshold value is existed, the prediction mode set having high resolution may be used for a prediction, and in the case that all the absolute values of the differential are smaller than the threshold value, the prediction mode set having low resolution may be used for a prediction In addition, for example, the encoder/decoder may calculate a differential of a sample value between two adjacent samples among the reference samples neighboring the current block 1301, and then, count the case that an absolute value of the differential is greater than a first threshold value. In the case that the counted number is greater than a second threshold value, the prediction mode set having high resolution may be used for a prediction, and in the case that the counted number is smaller than a second threshold value, the prediction mode set having low resolution may be used for a prediction.

In addition, the encoder/decoder may determine a resolution of the prediction mode set using a residual signal or a transform coefficient.

That is, the encoder/decoder may estimate a degree of complexity of the current block using a residual signal of the current block or a transform coefficient in which the residual signal is transformed to the frequency domain and determine a prediction mode set (or a resolution of the prediction mode set) used for a prediction of the current block.

For example, after transforming residual signals r_(1, 1), r_(2, 1), . . . , r_(N, N) of the current block, transform coefficients (or coefficients quantized after the transform) are designated to C_(1, 1), C_(2, 1), . . . , C_(N, N), and then, a resolution of the prediction mode set may be determined by comparing a sum of absolute values of the transform coefficients with threshold value T. That is, in the case that the sum is greater than threshold value T, the case is categorized that the current block has complex property and used for a prediction of the prediction mode set having high resolution. In the case that the sum is smaller than threshold value T, the case is categorized that the current block has simple property and used for a prediction of the prediction mode set having low resolution.

$$\sum_{i,j=1}^{N} |C_{i,j}| > T \qquad \text{[Equation 1]}$$

$$\sum_{i,j=1}^{N} |r_{i,j}^q| > T \qquad \text{[Equation 2]}$$

Second Embodiment

In this embodiment, it is proposed a method of using MPM for a prediction according to a prediction mode set.

In the case that the Most Probable Mode (MPM) encoding is applied to the current block, an encoder/decoder may use different MPMs according to the number of intra-prediction modes (according to a resolution of a prediction mode set) included in the prediction mode set.

For example, assuming the case that prediction mode set P_0 includes 35 types of intra-prediction modes and P_1 includes 67 types of intra-prediction modes, the encoder/decoder may use three MPM candidates (or MPM candidate list) for P_0 and use six MPM candidates for P_1.

In addition, for example, assuming the case that prediction mode set P_0 includes 9 types of intra-prediction modes and P_1 includes 67 types of intra-prediction modes, the encoder/decoder may use one MPM candidate for P_0 and use six MPM candidates for P_1.

Furthermore, the encoder/decoder may use the MPM list used for a prediction mode set having the highest resolution in a prediction mode set having a resolution which is lower than it.

For example, assuming the case that prediction mode set P_0 includes 35 types of intra-prediction modes and P_1 includes 67 types of intra-prediction modes, six MPM candidate lists may be used for P_1, and three candidates are selected used for MPM candidate list for P_0 in an ascending order among the six MPM candidate lists used for P_1.

In this case, in the case that the tree candidates are included in the prediction mode set having low resolution, the MPM candidate list may be used without any change, and in the case that there is a prediction mode not included in the prediction mode set, among the prediction modes included in the prediction mode set, the mode of which number is the closest is selected and used for MPM candidate.

Third Embodiment

In the first embodiment described above, among the prediction mode sets having different resolutions, a single prediction mode set used for the intra-prediction of the current block is determined, and the intra-prediction mode applied to the current block is derived in the determined prediction mode set.

In addition, based on the derived intra-prediction mode, a prediction block (or prediction sample) of the current block is generated. That is, according to the method described in the first embodiment, a single prediction mode set is determined among a plurality of prediction mode sets and used for the intra-prediction of the current block.

On the other hand, in this embodiment, it is proposed a method for performing an intra-prediction by using a prediction mode set having different resolution in a block and determining a prediction mode set adaptively in a pixel unit.

In this embodiment, in the case that various textures are included in a block (i.e., current encoding/decoding block) (i.e., block is complex), different prediction mode sets may be used adaptively in a block.

Hereinafter, in describing the present invention, for the convenience of description, it is mainly described a method for performing a prediction using two prediction mode sets, but the present invention is not limited thereto, and a prediction may be performed using three or more prediction mode sets.

First, an encoder/decoder may generate a prediction value of a current block using a prediction mode set having low resolution and estimate (or determine) a degree of complexity of the current block from a reference sample neighboring the current block, and in the case that the degree of complexity is high, the encoder/decoder may adjust the generated prediction value using a prediction mode set having high resolution.

Figure 14:
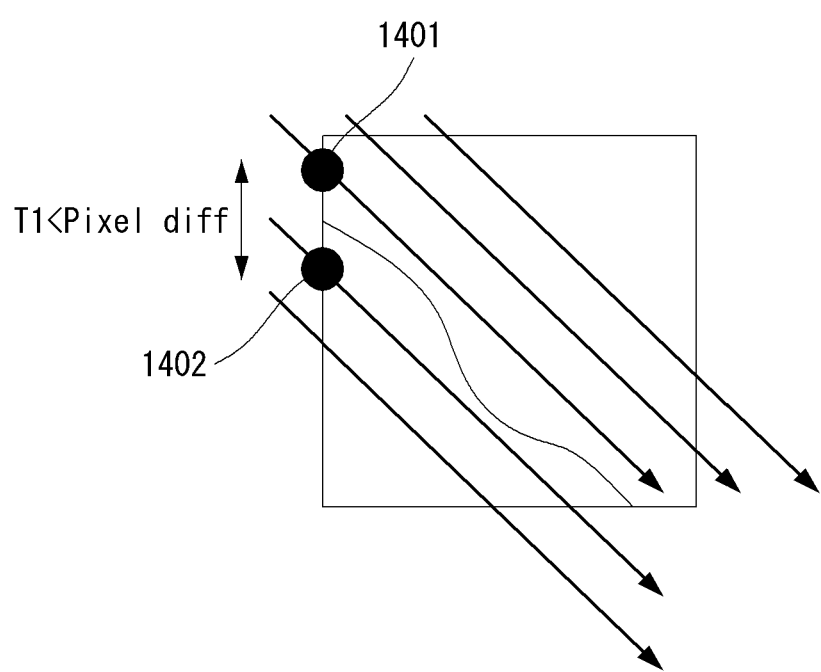
FIG. 14 is a diagram for describing an intra-prediction method using a plurality of prediction mode sets according to an embodiment of the present invention.

FIG. 14 is a diagram for describing an intra-prediction method using a plurality of prediction mode sets according to an embodiment of the present invention.

Referring to FIG. 14, the shaded area shows an area distinguished by a first reference sample 1401 and a second reference sample 1402 according to a prediction direction of an intra-prediction mode in the current block.

In the case that a boundary of an object or a complex texture is existed in the shaded area, a prediction mode set having higher resolution is used in the corresponding area, and an accuracy of prediction may be improved.

In order to use two or more prediction mode sets in a block, it is described a method of using two different prediction mode sets simultaneously in hierarchical manner. That is, after an intra-prediction using prediction mode set P_L of low resolution (or a first prediction mode set), a prediction value is adjusted by using prediction mode set P_H of high resolution (or a second prediction mode set) adaptively, and accordingly, a prediction may be performed more accurately. Here, condition P_H⊃P_L may be satisfied.

A method of configuring a prediction mode set may be exemplified as below.

1. P_H may include 67 types of prediction mode sets described in FIG. 10 above, and P_L may include 35 types of prediction mode sets used in the existing HEVC.

2. P_H may include 67 types of prediction mode sets, and P_L may include a prediction mode set using reference samples of integer pixel positions among 67 types of prediction modes.

3. P_L may include a prediction mode set using reference samples of integer pixel positions, and P_H may include a reference sample of an integer pixel position and includes a prediction mode set using reference samples of fractional pixel which is generated by interpolating reference samples of integer pixel positions.

4. P_L may include a prediction mode set using reference samples of fractional pixels generated by interpolating reference samples of integer pixel positions, and P_H may include a prediction mode set using reference samples of fractional pixels generated by more subdivided interpolation than P_L (i.e., reference samples of fractional pixels of smaller unit than P_L).

For example, P_L may include a prediction mode set using reference samples of 1/32 pixel unit, and P_H may include a prediction mode set using reference samples of 1/64 pixel unit.

The encoder/decoder may increase a resolution of the prediction mode set adaptively in the process of generating a prediction sample of each pixel in the current block by performing an intra-prediction.

Particularly, the encoder/decoder may derive a first intra-prediction mode applied to the current block in the first prediction mode set having relatively low resolution. In addition, the encoder/decoder may determine two reference samples used for a prediction of the current pixel based on the first intra-prediction mode.

Further, a differential of a sample value between two reference samples is calculated, and in the case that an absolute value of the differential exceeds a threshold value, the encoder/decoder may generate a prediction sample based on an intra-prediction mode adjacent to a prediction direction of the first intra-prediction mode in the second prediction mode set having relatively high resolution.

On the other hand, in the case that an absolute value of the differential is not greater than the threshold value, the encoder/decoder may use the first prediction mode set (i.e., the first intra-prediction mode) for a prediction.

Figure 15:
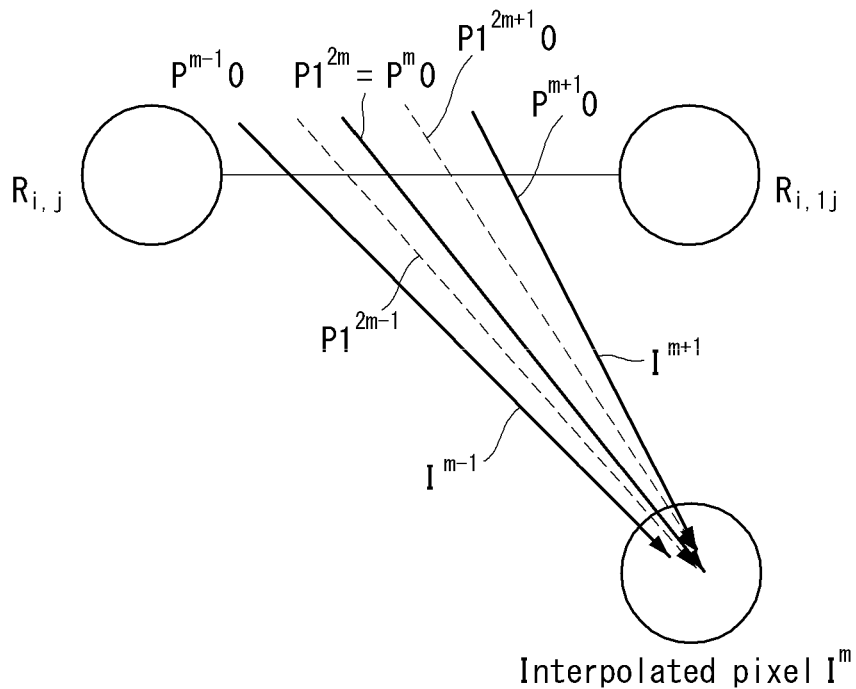
FIG. 15 is a diagram for describing a method for determining a prediction mode set adaptively as an embodiment to which the present invention may be applied.

FIG. 15 is a diagram for describing a method for determining a prediction mode set adaptively as an embodiment to which the present invention may be applied.

Referring to FIG. 15, prediction mode set P_L of low resolution described above is represented as P_0, and prediction mode set P_H of high resolution is represented as P_1.

The encoder/decoder generates a prediction value Im using Pm0 which is a prediction mode applied to the current pixel in P_0 (hereinafter, referred to as the first intra-prediction mode).

According to a prediction direction of Pm0, the prediction value Im of a current pixel may be generated by a value of interpolating two reference sample Ri, j and Ri+1, j.

Particularly, the encoder/decoder may generate the prediction value of the current pixel (or adjust the prediction value of the current pixel) based on a prediction mode in P_1 after determining the conditions of Equation 3 to Equation 5 below.

$$|R_{i+1,j} - R_{i,j}| > T_1 \qquad \text{[Equation 3]}$$

$$|I^{m-1} - I^m| > |I^{m+1} - I^m| + T_2 \qquad \text{[Equation 4]}$$

$$|I^m - I^m| + T_2 < |I^{m+1} - I^m| \qquad \text{[Equation 5]}$$

Here, I(m−1) and I(m+1) represent prediction values generated by using prediction modes P(m−1)0 and P(m+1)0 in P_0, respectively.

When Equation 3 is satisfied,

1) And when Equation 4 is satisfied, the encoder/decoder may adjust the prediction value of the current pixel using prediction mode $P^{(2m-1)}1$ in P_1.

2) And when Equation 5 is satisfied, the encoder/decoder may adjust the prediction value of the current pixel using prediction mode $P^{(2m+1)}1$ in P_1.

$P^{(2m+1)}1$ represents a prediction mode adjacent to a right side of the prediction direction of Pm0 based on the current pixel in P_1. And, $P^{(2m-1)}1$ represents a prediction mode adjacent to a left side of the prediction direction of Pm0 based on the current pixel in P_1.

In the case of using prediction mode $P^{(2m+1)}1$, the prediction value of the current pixel may be adjusted to $I^{(2m+1)}$, and in the case of using prediction mode $P^{(2m-1)}1$, the prediction value of the current pixel may be adjusted to $I^{(2m-1)}$.

In the case that the two conditions are not satisfied, the prediction value may not be adjusted. In this case, $I^m$ may be used without any change for the prediction value of the current pixel.

That is, the encoder/decoder may determine the first intra-prediction mode set of which resolution used in an intra-prediction of the current block is relatively low and the second intra-prediction mode set of which resolution is relatively high among a plurality of intra-prediction mode sets.

Further, the encoder/decoder may derive the first intra-prediction mode which is applied to the current block in the first intra-prediction mode set and determine two reference samples used for a prediction of the current pixel based on the first intra-prediction mode.

The encoder/decoder determines whether a differential of a sample value between two reference samples exceeds a specific threshold value.

In the case that the differential of a sample value between two reference samples does not exceed a specific threshold value, the encoder/decoder may not generate a prediction value of the current pixel based on the first intra-prediction mode.

On the other hand, in the case that the differential of a sample value between two reference samples exceeds a specific threshold value, the encoder/decoder may generate a prediction sample of the current pixel based on the intra-prediction mode adjacent to a left or right side of the prediction direction of the first intra-prediction mode based on the current pixel in the second intra-prediction mode set.

The intra-prediction mode used for a prediction of the current pixel in the second intra-prediction mode set may be determined according to the condition described above.

That is, the encoder/decoder, by comparing a prediction value generated based on the first intra prediction mode with a differential of a prediction value generated based on an intra prediction mode adjacent to left or right side of the prediction direction of the first intra prediction mode in the first intra prediction mode set based on the current pixel, may derive the second intra prediction mode applied to the current pixel among the intra prediction modes adjacent to left or right side of the prediction direction of the first intra prediction mode in the second intra-prediction mode set based on the current pixel.

Furthermore, the encoder/decoder may generate a prediction sample of the current pixel based on the second intra-prediction mode.

Each of the first to third embodiments described above may be used independently for a prediction, and a part or all the first to third embodiments may be used in combination for a prediction.

Figure 16:
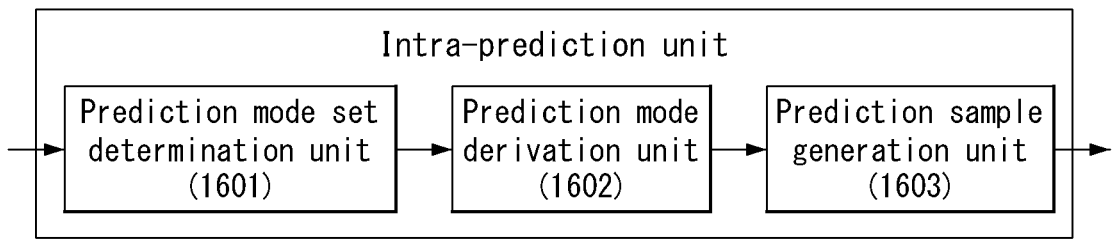
FIG. 16 is a diagram illustrating an intra prediction mode in more detail according to an embodiment of the present invention.

FIG. 16 is a diagram illustrating an intra prediction mode in more detail according to an embodiment of the present invention.

For the convenience of description, in FIG. 16, an intra prediction unit 182 (refer to FIG. 1) or 262 (refer to FIG. 2) is shown as a single block, but the intra prediction unit 182 or 262 may be implemented as an element which is included in an encoder and/or a decoder.

Referring to FIG. 16, the intra prediction unit 182 or 262 implements the function, the process and/or the method proposed in FIG. 5 to FIG. 17 above. Particularly, the intra prediction unit 182 or 262 may include a prediction mode set determination unit 1601, a prediction mode derivation unit 1602 and a prediction sample generation unit 1603.

The prediction mode set determination unit 1601 determines an intra prediction mode set used for an intra prediction in a current prediction processing unit among multiple intra prediction mode sets having different resolutions with each other.

As described above, the resolution represents a degree of distribution of the intra prediction mode in the intra prediction mode set. Further, each of the intra prediction mode sets may include one or more intra prediction modes.

In addition, as described above, the prediction mode set determination unit 1601 may determine the intra prediction mode set using an explicit method and an implicit method.

As described above, the prediction mode set determination unit 1601 may determine a prediction mode set (or resolution of a prediction mode set) from syntax indicating the prediction mode set (or resolution of a prediction mode set) used for the intra-prediction of the current block among a plurality of prediction mode sets.

For example, the encoder may signal the resolution of the prediction mode set in a unit of a sequence (or Sequence Parameter Set (SPS)), a slice, a CTU, a CU or a PU to the decoder.

In addition, as described above, the prediction mode set determination unit 1601 may determine a prediction mode set using a sample neighboring the current block. That is, the prediction mode set determination unit 1601 may estimate a degree of complexity of the current block using a reference sample neighboring the current block and determine a prediction mode set used for an intra-prediction of the current block from the estimated result.

For example, the prediction mode set determination unit 1601 may determine the prediction mode set used for a prediction of the current block by calculating a variance value of a reference sample neighboring the current block (e.g., (2N+1) samples located on coordinates from [−1, −1] to [−1, 2N−1] based on an upper left sample of the current block and 2N samples located on coordinates from [0, −1] to [2N−1, −1] among neighboring samples to the current block of N×N size), and comparing the variance value with a specific threshold value.

In addition, for example, the prediction mode set determination unit 1601 may determine the prediction mode set used for a prediction of the current block by calculating an absolute value of a differential of sample values between two adjacent samples among the reference samples neighboring the current block and comparing the absolute value of the differential.

In addition, for example, the prediction mode set determination unit 1601 may determine the intra prediction mode set used for a prediction of the current block by calculating the number of cases that the absolute value of the differential of sample values between two adjacent samples exceeds a first threshold value and comparing the calculated number with a second threshold value.

In addition, as described above, the prediction mode set determination unit 1601 may determine the intra prediction mode set used for a prediction of the current block by using a residual signal or a transform coefficient.

For example, the prediction mode set determination unit 1601 may determine the intra prediction mode set used for a prediction of the current block by comparing a residual signal of a current block or a sum of absolute values of transform coefficients of the residual signal with a specific threshold value. At this time, Equation 1 or Equation 2 described above may be used.

In addition, as described above, in the case that Most Probable Mode (MPM) encoding is applied to the current block, the number of MPM candidates may be determined depending on the number of intra prediction modes configuring the intra prediction mode set used for an intra prediction of the current block.

The prediction mode derivation unit 1602 derives an intra-prediction mode applied to the current block in the determined prediction mode set.

The encoder may transmit index information for indicating the intra-prediction mode applied to the current block in the determined prediction mode set. Further, the prediction mode derivation unit 1602 may derive the intra-prediction mode applied to the current block using the index information received from the encoder.

The prediction sample generation unit 1603 generates a prediction sample of the current block based on the derived intra prediction mode.

In the case that a directional prediction method is applied, the prediction sample generation unit 1603 may generate a prediction sample from one or two reference samples which are determined according to the prediction direction of the intra-prediction mode of the current block.

In the case that a non-directional prediction method is applied, the prediction sample generation unit 1603 may generate a prediction sample by performing a weighted sum of average values of neighboring reference sample or neighboring reference sample.

In the aforementioned embodiments, the elements and characteristics of the present invention have been combined in specific forms. Each of the elements or characteristics may be considered to be optional unless otherwise described explicitly. Each of the elements or characteristics may be implemented in such a way as to be not combined with other elements or characteristics. Furthermore, some of the elements and/or the characteristics may be combined to form an embodiment of the present invention. The order of the operations described in connection with the embodiments of the present invention may be changed. Some of the elements or characteristics of an embodiment may be included in another embodiment or may be replaced with corresponding elements or characteristics of another embodiment. It is evident that an embodiment may be configured by combining claims not having an explicit citation relation in the claims or may be included as a new claim by amendments after filing an application.

The embodiment of the present invention may be implemented by various means, for example, hardware, firmware, software or a combination of them. In the case of implementations by hardware, an embodiment of the present invention may be implemented using one or more application-specific integrated circuits (ASICs), digital signal processors (DSPs), digital signal processing devices (DSPDs), programmable logic devices (PLDs), field programmable gate arrays (FPGAs), processors, controllers, microcontrollers and/or microprocessors.

In the case of an implementation by firmware or software, an embodiment of the present invention may be implemented in the form of a module, procedure, or function for performing the aforementioned functions or operations. Software code may be stored in memory and driven by a processor. The memory may be located inside or outside the processor and may exchange data with the processor through a variety of known means.

It is evident to those skilled in the art that the present invention may be materialized in other specific forms without departing from the essential characteristics of the present invention. Accordingly, the detailed description should not be construed as being limitative from all aspects but should be construed as being illustrative. The scope of the present invention should be determined by reasonable analysis of the attached claims, and all changes within the equivalent range of the present invention are included in the scope of the present invention.

INDUSTRIAL APPLICABILITY

The aforementioned preferred embodiments of the present invention have been disclosed for illustrative purposes, and those skilled in the art may improve, change, substitute, or add various other embodiments without departing from the technological spirit and scope of the present invention disclosed in the attached claims.

The invention claimed is:

1. A method for processing an image based on an intra prediction mode, comprising:
   determining an intra prediction mode set used for an intra prediction in a current prediction processing unit among multiple intra prediction mode sets,
   wherein each of the multiple intra prediction mode sets has a different resolution,
   wherein the intra prediction mode set is determined by comparing an absolute value of a differential of sample values between two adjacent samples among reference samples with a first threshold value, and
   wherein the resolution represents a number of the intra prediction mode in the intra prediction mode set;
   deriving an intra prediction mode applied to the current prediction processing unit in the determined intra prediction mode set using index information received from an encoder; and
   generating a prediction sample of the current prediction processing unit based on the derived intra prediction mode,
   wherein each of the intra prediction mode sets includes one or more intra prediction modes.

2. The method of claim 1, wherein the reference samples indicate (2N+1) samples located on coordinates from [−1, −1] to [−1, 2N−1] based on an upper left sample of a current block and 2N samples located on coordinates from [0, −1] to [2N−1, −1] among neighboring samples to a current block of N×N size.

3. The method of claim 2, wherein the intra prediction mode set is determined by calculating a number of cases that the absolute value of the differential of the sample values between two adjacent samples exceeds the first threshold value among the reference samples, and comparing the calculated number with a second threshold value.

4. The method of claim 1, wherein the step of determining the intra prediction mode set includes determining the intra prediction mode set by comparing a residual signal of a current block or a sum of absolute values of transform coefficients of the residual signal with a specific threshold value.

5. The method of claim 1, wherein the intra prediction mode set is transmitted in any one unit of a sequence, a slice, a CTU, a CU and a PU.

6. The method of claim 1, when Most Probable Mode (MPM) encoding is applied to a current block, a number of MPM candidates is determined depending on a number of intra prediction modes configuring the intra prediction mode set used for an intra prediction of the current block.

7. A method for processing an image based on an intra prediction mode, comprising:
   determining an intra prediction mode set used for an intra prediction in a current prediction processing unit among multiple intra prediction mode sets, wherein each of the multiple intra prediction mode sets has a different resolution, and wherein the resolution represents a number of the intra prediction mode in the intra prediction mode set;
   deriving an intra prediction mode applied to the current prediction processing unit in the determined intra prediction mode set using index information received from an encoder; and
   generating a prediction sample of the current prediction processing unit based on the derived intra prediction mode,
   wherein each of the intra prediction mode sets includes one or more intra prediction modes,
   wherein the step of determining the intra prediction mode set includes:
      determining a first intra prediction mode set and a second intra prediction mode set used for an intra prediction of a current block among the multiple intra prediction mode sets,
   wherein the step of deriving the intra prediction mode includes:
      deriving a first intra prediction mode applied to the current block in the first intra prediction mode set using the index information,
   wherein the step of generating the prediction sample further includes:

determining two reference samples used for a prediction of a current pixel based on the first intra prediction mode, when a differential of a sample value between two reference samples exceeds a specific threshold value, generating the prediction sample of the current pixel based on an intra prediction mode adjacent to a prediction direction of the first intra prediction mode in the second intra prediction mode set.

8. The method of claim 7, wherein the step of generating the prediction sample of the current pixel further includes:

by comparing a prediction value generated based on the first intra prediction mode with a differential of a prediction value generated based on an intra prediction mode adjacent to left or right side of the prediction direction of the first intra prediction mode in the first intra prediction mode set based on the current pixel, deriving a second intra prediction mode applied to the current pixel among the intra prediction mode adjacent to left or right side of the prediction direction of the first intra prediction mode in the second intra prediction mode set based on the current pixel, wherein the prediction sample of the current pixel is generated based on the second intra prediction mode.

9. An apparatus for processing an image based on an intra prediction mode, comprising:

a processor configured to:

determine an intra prediction mode set used for an intra prediction in a current prediction processing unit among multiple intra prediction mode sets, wherein each of the multiple intra prediction mode sets has a different resolution, wherein the intra prediction mode set is determined by comparing an absolute value of a differential of sample values between two adjacent samples among reference samples with a first threshold value, and wherein the resolution represents a number of the intra prediction mode in the intra prediction mode set, derive an intra prediction mode applied to the current prediction processing unit in the determined intra prediction mode set using index information received from an encoder, and generate a prediction sample of the current prediction processing unit based on the derived intra prediction mode, wherein each of the intra prediction mode sets includes one or more intra prediction modes.

* * * * *